(12) United States Patent
Favaretto

(10) Patent No.: US 12,320,291 B2
(45) Date of Patent: Jun. 3, 2025

(54) CAR PROVIDED WITH AN INTERNAL COMBUSTION ENGINE IN WHICH THE PUMPS ARE OPERATED BY THE CAMSHAFTS

(71) Applicant: FERRARI S.P.A., Modena (IT)

(72) Inventor: Fabrizio Favaretto, Modena (IT)

(73) Assignee: FERRARI S.p.A., Modena (IT)

( * ) Notice: Subject to any disclaimer, the term of this patent is extended or adjusted under 35 U.S.C. 154(b) by 60 days.

(21) Appl. No.: 18/454,880

(22) Filed: Aug. 24, 2023

(65) Prior Publication Data

US 2024/0068393 A1  Feb. 29, 2024

(30) Foreign Application Priority Data

Aug. 25, 2022 (IT) .......... 102022000017616

(51) Int. Cl.
| | | |
|---|---|---|
| *F01L 1/18* | (2006.01) | |
| *B60K 5/02* | (2006.01) | |
| *F01M 1/02* | (2006.01) | |
| *F01P 5/12* | (2006.01) | |

(52) U.S. Cl.
CPC ........ *F01P 5/12* (2013.01); *B60K 5/02* (2013.01); *F01M 1/02* (2013.01); *F01M 2001/0261* (2013.01)

(58) Field of Classification Search
CPC .............. F01L 1/185; F01L 2250/04; F01M 2001/0261
See application file for complete search history.

(56) References Cited

U.S. PATENT DOCUMENTS

| | | | | |
|---|---|---|---|---|
| 4,446,828 A | * | 5/1984 | Bauder | F02B 67/08 |
| | | | | 123/196 R |
| 4,662,320 A | * | 5/1987 | Moriya | F01L 1/053 |
| | | | | 123/198 C |
| 4,662,323 A | * | 5/1987 | Moriya | F02F 1/4214 |
| | | | | 123/90.23 |
| 5,524,581 A | | 6/1996 | Rush, II et al. | |

(Continued)

FOREIGN PATENT DOCUMENTS

| | | |
|---|---|---|
| DE | 4242871 A1 | 6/1994 |
| EP | 0653553 A2 | 5/1995 |

OTHER PUBLICATIONS

Italian Search Report for Application No. 102022000017616, Filing Date: Aug. 25, 2022; Date of Mailing: Mar. 7, 2023, 6 pages.

*Primary Examiner* — Long T Tran
(74) *Attorney, Agent, or Firm* — CANTOR COLBURN LLP

(57) ABSTRACT

A car having: two front wheels; two rear wheels; an internal combustion engine, which is provided with: a plurality of cylinders, where respective pistons slide on the inside, a drive shaft connected to the pistons, a plurality of intake valves and of exhaust valves operated by respective camshafts, and a cylinder head, where the camshafts are arranged; at least one lubrication pump configured to cause a lubricant oil to circulate; and at least one cooling pump configured to cause a coolant liquid to circulate. A camshaft axially projects out of the cylinder head on at least one side, and the lubrication pump is coaxial to the camshaft and is directly connected to the camshaft so as to be caused to rotate by the camshaft.

12 Claims, 28 Drawing Sheets

(56) References Cited

U.S. PATENT DOCUMENTS

| | | | |
|---|---|---|---|
| 5,743,228 A * | 4/1998 | Takahashi | F01L 1/02 123/195 P |
| 7,188,601 B1 | 3/2007 | Trease | |
| 2008/0000309 A1 | 1/2008 | Tsubouchi | |

* cited by examiner

CAR PROVIDED WITH AN INTERNAL COMBUSTION ENGINE IN WHICH THE PUMPS ARE OPERATED BY THE CAMSHAFTS

CROSS-REFERENCE TO RELATED APPLICATIONS

This patent application claims priority from Italian patent application no. 102022000017616 filed on Aug. 25, 2022, the entire disclosure of which is incorporated herein by reference.

TECHNICAL FIELD

The present invention relates to a car provided with an internal combustion engine.

PRIOR ART

A known internal combustion engine comprises a plurality of intake and exhaust valves which are operated by respective camshafts caused to rotate by the drive shaft by means of a toothed belt, chain or gear transmission system. Furthermore, a known internal combustion engine comprises a lubrication circuit which causes lubricant oil to circulate in all the movable components and utilises at least one lubrication pump which is caused to rotate by the drive shaft; generally, the lubrication pump directly gets the motion from the drive shaft by means of a smooth belt transmission system. Finally, a known internal combustion engine comprises a cooling circuit which causes a coolant liquid (typically a mixture of water and glycol) to circulate and utilises a cooling pump which is caused to rotate by the drive shaft; generally, the cooling pump directly gets the motion from the drive shaft by means of a smooth belt transmission system.

Documents U.S. Pat. No. 7,188,601B1, US2008000309A1, DE4242871A1 and U.S. Pat. No. 5,524,581A describe internal combustion engines in which a lubrication pump directly gets the motion from a camshaft which axially projects out of the cylinder head.

DESCRIPTION OF THE INVENTION

The object of the present invention is to provide a car provided with an internal combustion engine which allows optimising the placing of the lubrication pump and of the cooling pump.

According to the present invention a car provided with a powered internal combustion engine is provided, in accordance with what is claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate some non-limiting examples thereof, wherein.

PREFERRED EMBODIMENTS OF THE INVENTION

Figure 1:
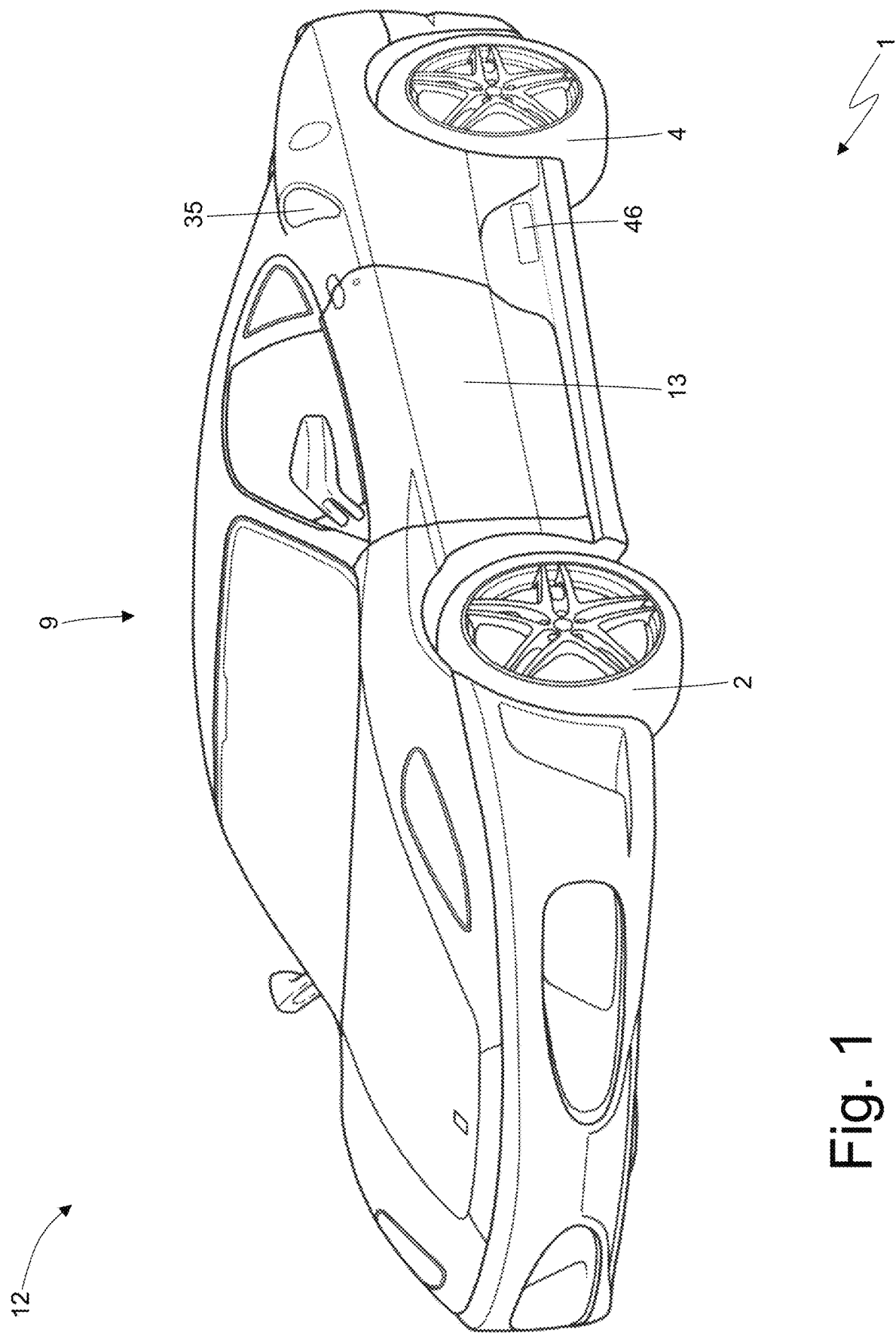
FIG. 1 is a perspective view of a car provided with an internal combustion engine.
Figure 4:
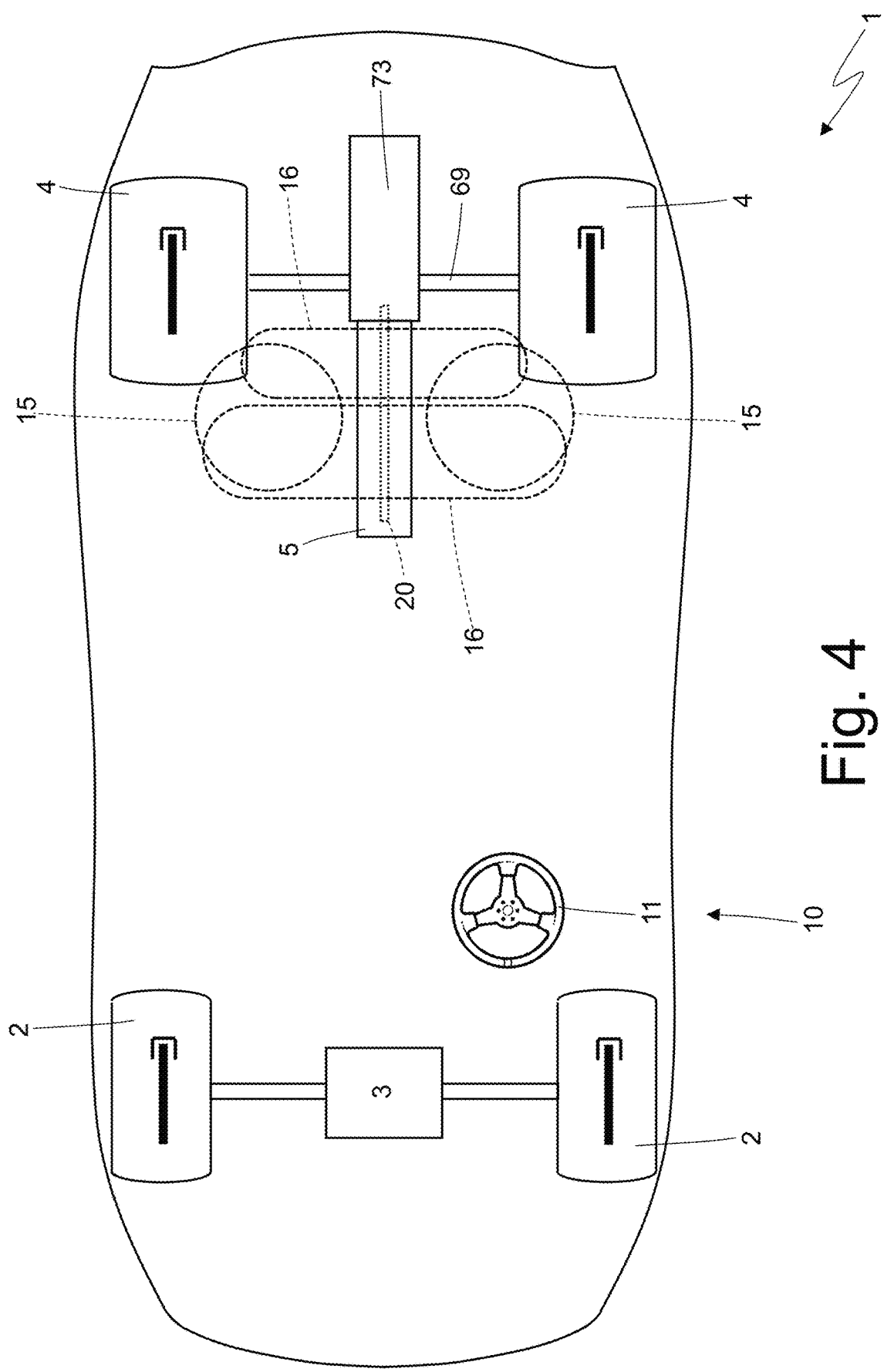
FIG. 4 is a schematic plan view of the car of FIG. 1.

In FIG. 1, reference numeral 1 indicates, as a whole, a hybrid car (i.e. with hybrid propulsion) provided with two front drive wheels 2 which receive the drive torque from an (at least one) electrical machine 3 (schematically illustrated in FIG. 4) and with two rear drive wheels 4 which receive the drive torque from an internal combustion engine 5 (schematically illustrated in FIG. 4).

Figure 15:
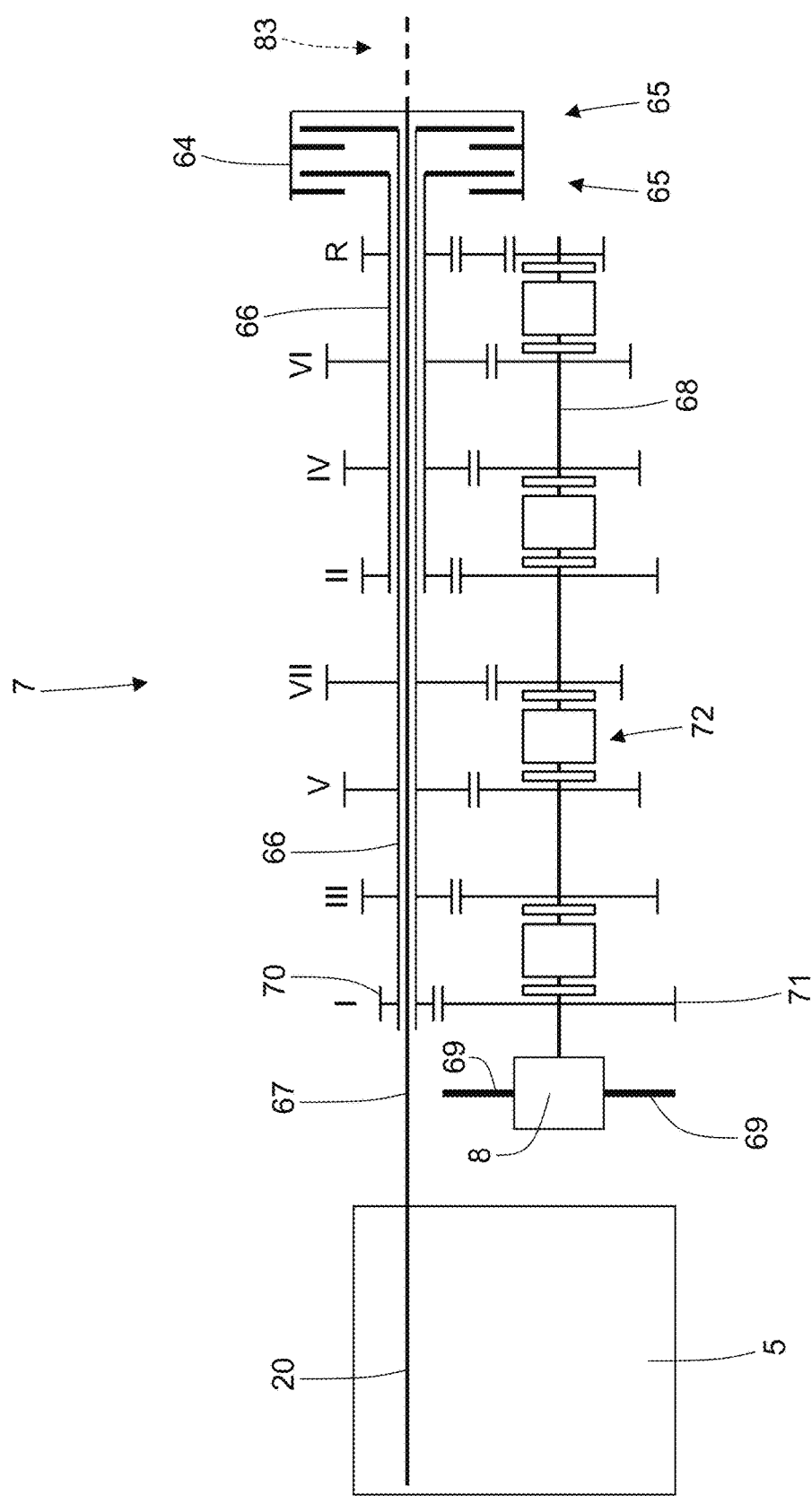
FIG. 15 is a schematic view of the transmission system of FIGS. 13 and 14.

According to what is illustrated in FIG. 4, the electrical machine 3 is connected to the two front drive wheels 2 by means of a transmission system (of known type and not illustrated) provided with a front differential; similarly, also the internal combustion engine 5 is connected to the two rear drive wheels 4 by means of a transmission system 6 provided with a gearbox 7 and with a rear differential 8 (schematically illustrated in FIG. 15).

Preferably, the electrical machine 3 is reversible (i.e. can operate both as electric motor absorbing electric energy and generating a mechanical drive torque, and as electric generator absorbing mechanical energy and generating electric energy); according to other embodiments not illustrated, the electrical machine 3 is not provided.

Figure 2:
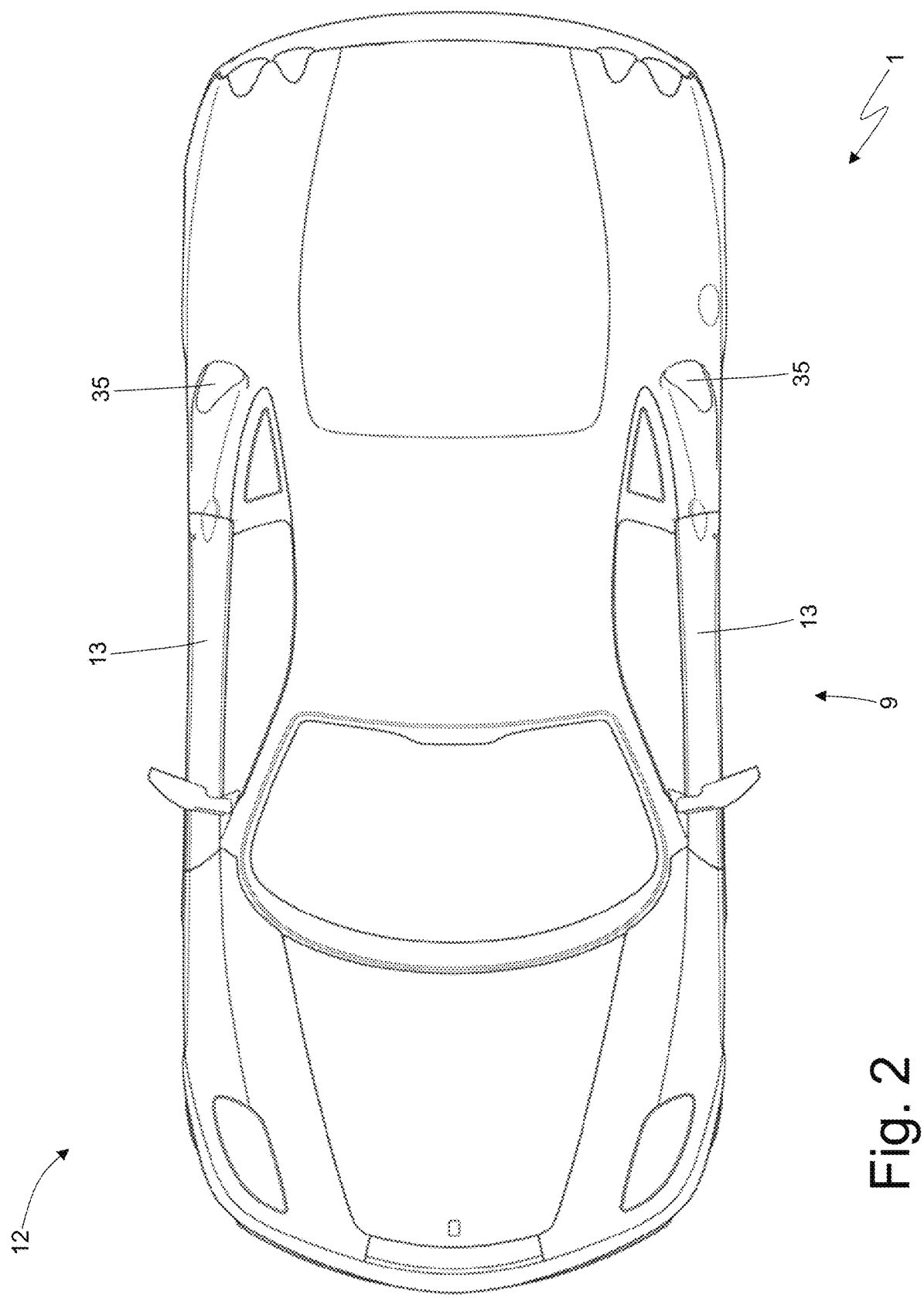
FIGS. 2 and 3 are a top view and a bottom view, respectively, of the car of FIG. 1.

According to what is illustrated in FIGS. 1 and 2, the car 1 comprises a passenger compartment 9 which is arranged between the two front wheels 2 and the two rear wheels 4 and accommodates on its inside a driving place 10 (schematically illustrated in FIG. 4) which is arranged on the left side (in alternative, it could also be arranged on the right side). According to what is illustrated in FIG. 4, the driving place 10 comprises a steering wheel 11, a driver's seat (not illustrated) and a series of other commands (known and not illustrated) operable by a driver (among which, for example, an accelerator pedal, a brake pedal and at least one lever for selecting the gears).

According to what is illustrated in FIGS. 1 and 2, the car 1 comprises a bodywork 12 which delimits (among the other things) the passenger compartment 9 and has two sides in which at least two doors 13 are obtained. The left door 13 allows the direct access to the driving place 10.

Figure 3:
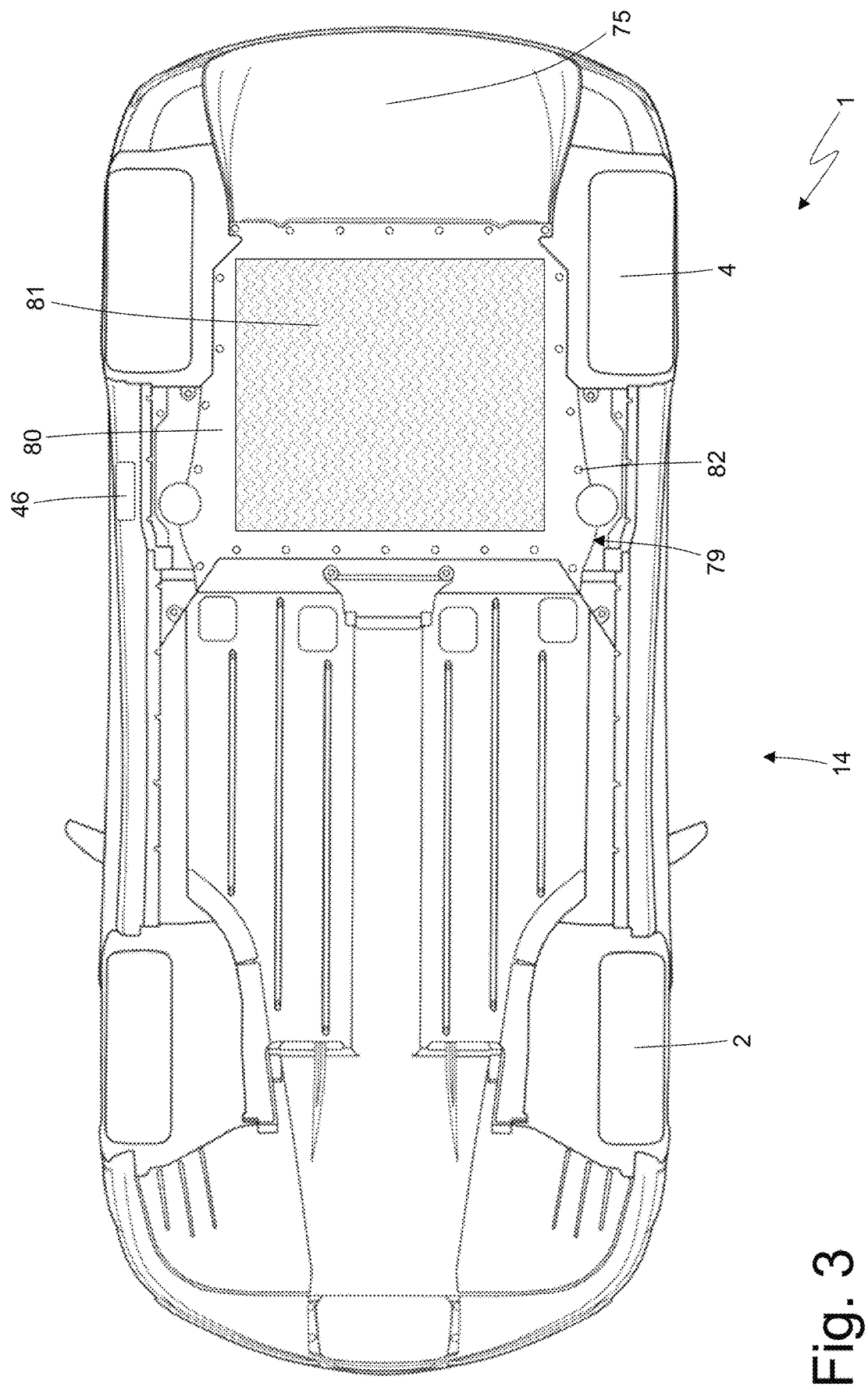

According to what is illustrated in FIG. 3, the car 1 comprises a bottom 14 which makes up the lower part of the car 1 and in use faces a road surface on which the car 1 moves.

According to a possible embodiment, the internal combustion engine 5 is powered by hydrogen (or also other gaseous fuel). According to a different embodiment, the internal combustion engine 5 is powered by petrol (or also other liquid fuel).

According to what is illustrated in FIG. 4, the internal combustion engine 5 is powered by hydrogen which is stored at high pressure (for example with a maximum pressure of about 700 bars) in four different tanks 15 and 16: the two tanks 15 have a spherical shape and have the same dimension, whereas the two tanks 16 have a cylindrical shape and have different dimensions (i.e. one tank 16 is larger than the other tank 16).

The two tanks 15 (having spherical shape) are arranged next to an engine block of the internal combustion engine 5 on the two opposite sides of the internal combustion engine 5; i.e. one tank 15 is arranged on the right of the engine block of the internal combustion engine 5, whereas the other tank 15 is arranged on the left of the engine block of the internal combustion engine 5. In other words, the two tanks 15 (having spherical shape) are arranged at the same vertical elevation, are arranged at the same longitudinal elevation and are separated from one another transversally (with the interposition of the engine block of the internal combustion engine 5), i.e. are spaced apart from one another only transversally.

The two tanks 16 (having cylindrical shape) are arranged on top of the internal combustion engine 5 in front of one another. In other words, the two tanks 16 (having cylindrical shape) are arranged (approximately) at the same vertical elevation, are arranged at the same transversal elevation and are separated from one another longitudinally, i.e. are spaced apart from one another only longitudinally (i.e. one is arranged in front of the other). In particular, both tanks 16 (having cylindrical shape) are oriented transversally, i.e. their central symmetry axes are oriented transversally. In the embodiment illustrated in FIG. 4, the tank 16 arranged at the front (i.e. closer to the front) is larger than the tank 16 arranged at the back (i.e. closer to the rear).

Figure 5:
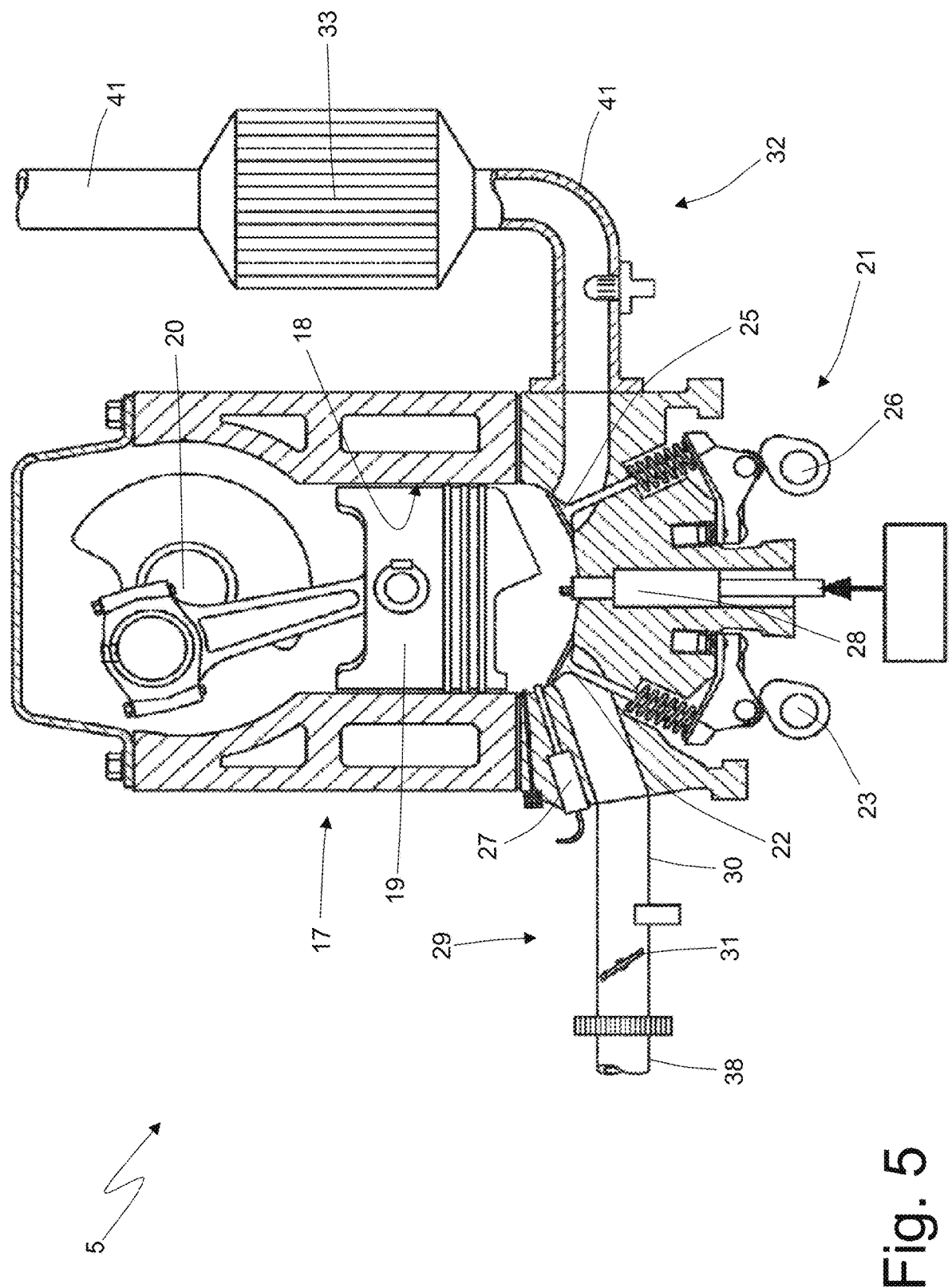
FIG. 5 is a schematic view of the internal combustion engine of the car of FIG. 1.

According to what is illustrated in FIG. 5, the internal combustion engine 5 comprises a crankcase 17 inside which a plurality of cylinders 18 (only one of which is illustrated in FIG. 5) is obtained. Preferably (but not compulsorily), the cylinders 18 are arranged in line since this solution allows reducing the transversal bulk of the internal combustion engine 5 and thus, among the other things, allows leaving a greater space to the tanks 15. In the embodiment illustrated in the accompanying figures, six cylinders 18 in line are provided, but obviously the number and the arrangement of the cylinders 18 could be different.

Each cylinder 18 has a respective combustion chamber and a respective piston 19 mechanically connected to a drive shaft 20 (by means of a respective connecting rod) for transmitting to the drive shaft 20 the force generated by the combustion. The crankcase 17 is coupled (connected) to a cylinder head (or head) 21 which makes up the crown of the cylinders 18 (i.e. the upper closure of the cylinders 18 with the so-called "flame plate"). In the case of an arrangement in line of the cylinders 18, one single cylinder head 21 is provided, whereas in the case of a "V" arrangement of the cylinders 18, two twin cylinder heads 21 are provided for the two main bearings of cylinders 18.

The assembly of the crankcase 17 and of the cylinder head 21 makes up the engine block of the internal combustion engine 5.

In the embodiment illustrated in the accompanying figures, the internal combustion engine 5 is arranged (oriented) longitudinally, i.e. the drive shaft 20 is arranged (oriented) longitudinally since this solution allows reducing the transversal bulk of the internal combustion engine 5 and thus, among the other things, leaving a greater space to the tanks 15. According to other embodiments not illustrated, the internal combustion engine 5 is arranged (oriented) transversally.

In the embodiment illustrated in the accompanying figures, the internal combustion engine 5 is arranged in central or rear position, i.e. the internal combustion engine 5 is arranged behind the passenger compartment 9 and is located between the front wheels 2 and the rear wheels 4 (central arrangement as is illustrated in the accompanying figures) or is beyond the rear wheels 4 (rear arrangement not illustrated).

Each cylinder 18 comprises two intake valves 22 controlled by a camshaft 23 which receives the motion from the drive shaft 20 by means of a belt transmission 24 (illustrated in FIG. 26); in alternative to the belt transmission 24, a chain transmission or a gear transmission could be used. Furthermore, each cylinder 18 comprises two exhaust valves 25 controlled by a camshaft 26 which receives the motion from the drive shaft 20 by means of the belt transmission 24 (illustrated in FIG. 26). The intake valves 22, the exhaust valves 25 and the corresponding control means (i.e. the return springs and the camshafts 23 and 26) are housed in the cylinder head 21.

Each cylinder 18 further comprises a (at least one) fuel injector 27 which cyclically injects the fuel into the cylinder 18; FIG. 5 illustrates a direct injection of the fuel into the cylinder 18 but the injection of the fuel into the cylinder 18 could also be (partially or completely) indirect. Each cylinder 18 comprises a (at least one) spark plug 28 which is cyclically activated for triggering the ignition of the mixture of air (comburent) and fuel present in the combustion chamber at the end of the compression step.

According to what is illustrated in the accompanying figures, the internal combustion engine 5 is oriented vertically with the drive shaft 20 arranged higher than the cylinders 18. In other words, the internal combustion engine 5 is arranged "upside down" with respect to the traditional arrangement which provides for the cylinders 18 to be at the top and the drive shaft 20 at the bottom. Consequently, the cylinder head 21 which makes up the crown of the cylinders 18 is arranged under the crankcase 17 and is the lowest part of the internal combustion engine 5.

The internal combustion engine 5 comprises an intake system 29 which collects air from the external environment for conveying the air into the cylinders 18 (the inlet of the air into the cylinders 18 is adjusted by the intake valves 22). Among the other things, the intake system 29 comprises an intake manifold 30 which is directly connected to all the cylinders 18; the inlet of the air into the intake manifold 30 is adjusted by a throttle valve 31.

The internal combustion engine 5 comprises an exhaust system 32 which lets the exhaust gases coming from the cylinders 18 into the external environment. Among the other things, the intake system 29 comprises a (at least one) treatment device 33 for treating the exhaust gases (typically a catalytic converter).

According to what is illustrated in FIGS. 9-12, the intake system 29 comprises two twin intake ducts 34 which are separated and arranged on the two sides of the car 1 (i.e. one intake duct 34 is arranged on the right side and the other intake duct 34 is arranged on the left side) and originates from respective air intakes 35 obtained through the bodywork 12. Along each intake duct 34 and in the proximity of the respective air intake 35, an air filter 36 is arranged. Each intake duct 34 ends in a compressor assembly 37 which increases the pressure of the air for increasing the volumetric efficiency of the cylinders 18. From the compressor assembly 37 one single intake duct 38 originates which ends in the intake manifold 30 after passing through two intercoolers 39 and 40 arranged in series. In other words, an initial section of the intake duct 38 connects the compressor assembly 37 to the intercooler 39, thus an intermediate section of the intake duct 38 connects the intercooler 39 to the intercooler 40, and finally a final section of the intake duct 38 connects the intercooler 40 to the intake manifold 30.

According to a preferred embodiment, the intercooler 39 is of air/air type and also the intercooler 40 is of air/air type. According to a preferred embodiment, the intercooler 39 has a greater volume than a volume of the intercooler 40; to such regard, it is important to observe that the intercooler 39 is disadvantaged with respect to the intercooler 40, since it is arranged farther from the corresponding air intake and compensates this disadvantage both with a greater volume, and having to cool air having a higher inlet temperature (since the intercooler 39 receives the air directly from the compressor assembly 37, whereas the intercooler 40 being arranged in series at the intercooler 39 receives the air already partially cooled by the intercooler 39).

According to what is illustrated in FIGS. 9-12, the exhaust system 32 comprises two twin exhaust ducts 41 which are separated and receive the exhaust gases from respective cylinders 18 to which they are connected singularly; in particular, each exhaust duct 41 is connected to three cylinders 18 by means of respective canalizations which originate from the three cylinders 18 and end in an inlet of the exhaust duct 41 (from another point of view, each exhaust duct 41 is initially divided into three parts for connecting with the respective three cylinders 18). Along each exhaust duct 41 a corresponding treatment device 33 is arranged for treating the exhaust gases (typically a catalytic converter); therefore, on the whole, the exhaust system 32 comprises two twin treatment devices 33 for treating the exhaust gases which are separated.

Along the exhaust ducts 41 a turbine assembly 42 is arranged provided with two twin turbines 43 (better illustrated in FIG. 17), each of which is coupled to a corresponding exhaust duct 41. In other words, each exhaust duct 41 passes through a respective turbine 43 and the two turbines 43 are arranged side by side for making up the turbine assembly 42. In other words, a turbine 43 is provided which is connected along each exhaust duct 41 and is arranged next to the engine block (made up of the crankcase 17 and of the cylinder head 21) of the internal combustion engine 5.

The two exhaust ducts 41 end in one single common silencer 44 which receives the exhaust gases from both exhaust ducts 41. According to other embodiments not illustrated, two twin silencers 44 are provided which are separated, each of which receives the exhaust gases only from a respective exhaust duct 41.

In the preferred embodiment illustrated in the accompanying figures, the silencer 44 has a single final pipe 45 of the exhaust gases which leads to an outlet opening 46; according to other embodiments not illustrated, the silencer 44 has two or more final pipes 45, each of which leads to a corresponding outlet opening 46.

Figure 16:
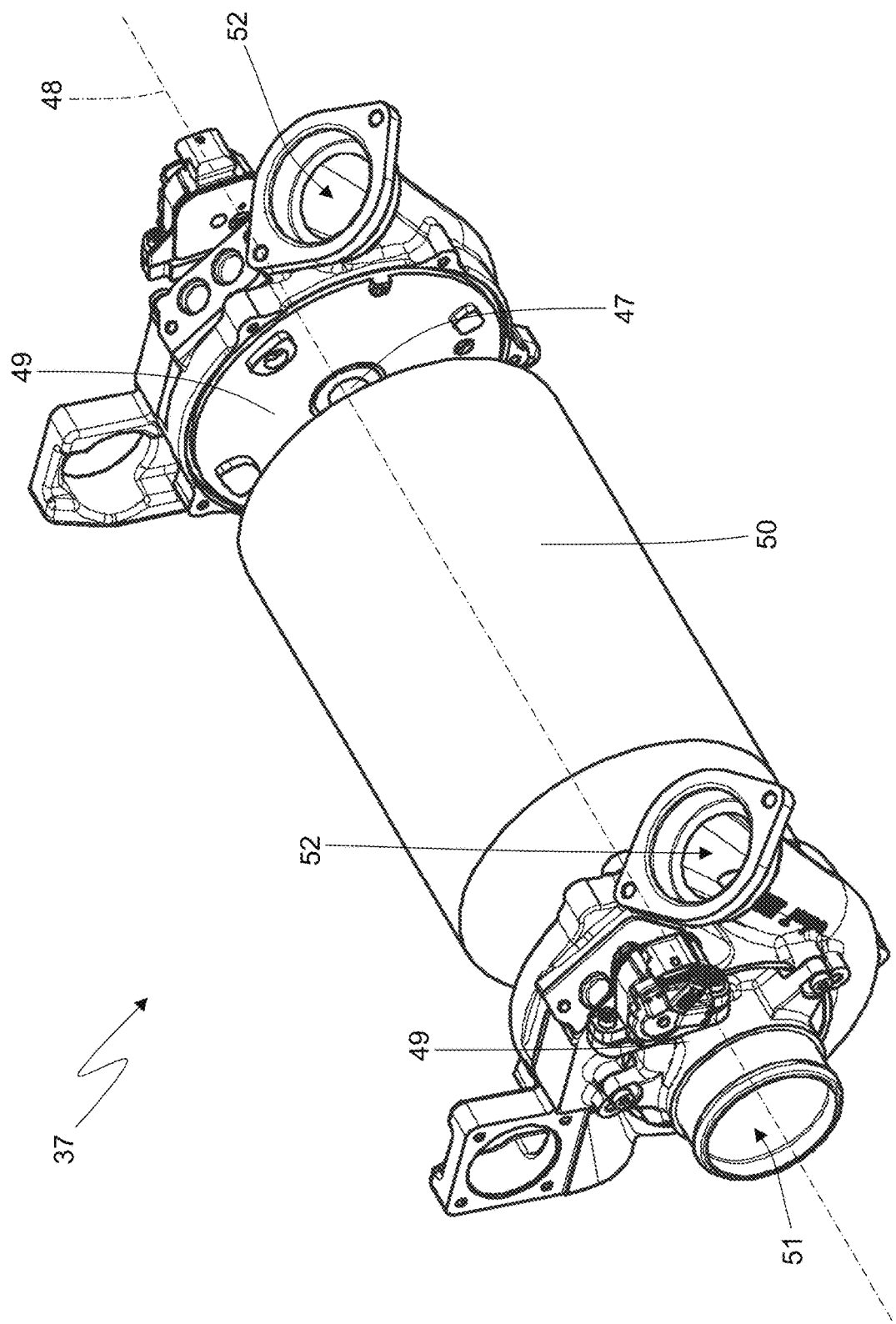
FIG. 16 is a perspective view of a compressor assembly of the internal combustion engine of the car of FIG. 1.

According to what is illustrated in FIG. 16, the compressor assembly 37 (destined to be utilised in the supercharged internal combustion engine 5) comprises one single shaft 47 mounted rotatable around an axis of rotation 48. In the embodiment illustrated in the accompanying figures, the shaft 47 (thus the axis of rotation 48) is oriented transversally; according to a different embodiment not illustrated, the shaft 47 (thus the axis of rotation 48) is oriented longitudinally or is inclined (not parallel) both with respect to the longitudinal direction, and with respect to the transversal direction.

The compressor assembly 37 comprises two twin (identical) compressors 49, each of which is integral with the shaft 47 for rotating together with the shaft 47 and is configured to compress air destined to be sucked by the supercharged internal combustion engine 5; in particular, each compressor 49 receives the air from a respective intake duct 34 (i.e. each intake duct 34 ends in a corresponding compressor 49).

The compressor assembly 37 comprises one single common electric motor 50 which is integral with the shaft 47 for causing the shaft 47 to rotate (and thus to cause both compressors 49 mounted on the shaft 47 to rotate). In the embodiment illustrated in the accompanying figures, the electric motor 50 is arranged between the two compressors 49 and is perfectly equidistant from the two compressors 49; according to a different embodiment not illustrated, the electric motor 50 is arranged on one side with respect to both compressors 49 (i.e. is closer to one compressor 49 and is farther from the other compressor 49).

As mentioned in the foregoing, the two compressors 49 are identical and are of centrifugal type. In particular, each compressor 49 comprises an axial inlet 51 arranged on the opposite side of the shaft 47 and connected to a respective intake duct 34 and a radial outlet 52. According to a preferred embodiment, the compressor assembly 37 comprises a connection duct 53 (illustrated in FIGS. 9-12) which is connected to both outlets 52 of the two compressors 49 for receiving and joining the air compressed by both compressors 49; the connection duct 53 ends in the intake duct 38, i.e. the intake duct 38 starts from the connection duct 53 for receiving and joining the air compressed by both compressors 49.

In the embodiment illustrated in the accompanying figures, the connection duct 53 is oriented transversally; according to a different embodiment not illustrated, the connection duct 53 is oriented longitudinally or is inclined (not parallel) both with respect to the longitudinal direction, and with respect to the transversal direction.

In the embodiment illustrated in the accompanying figures, the connection duct 53 is oriented parallel to the shaft 47 (thus to the axis of rotation 48); according to a different embodiment not illustrated, the connection duct 53 is not oriented parallel to the shaft 47 thus to the axis of rotation 48).

Figure 17:
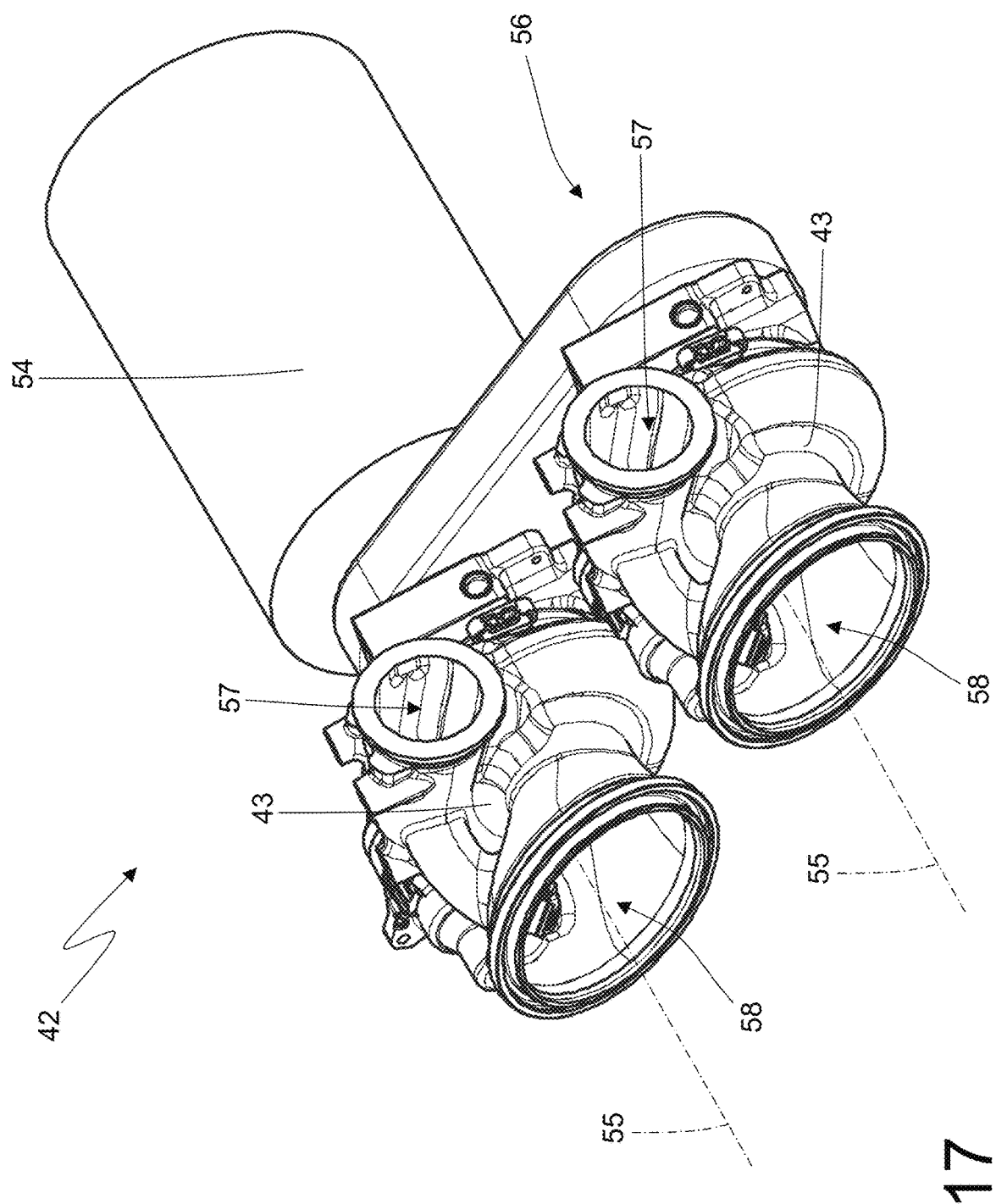
FIG. 17 is a perspective view of a turbine assembly of the internal combustion engine of the car of FIG. 1.
Figure 18:
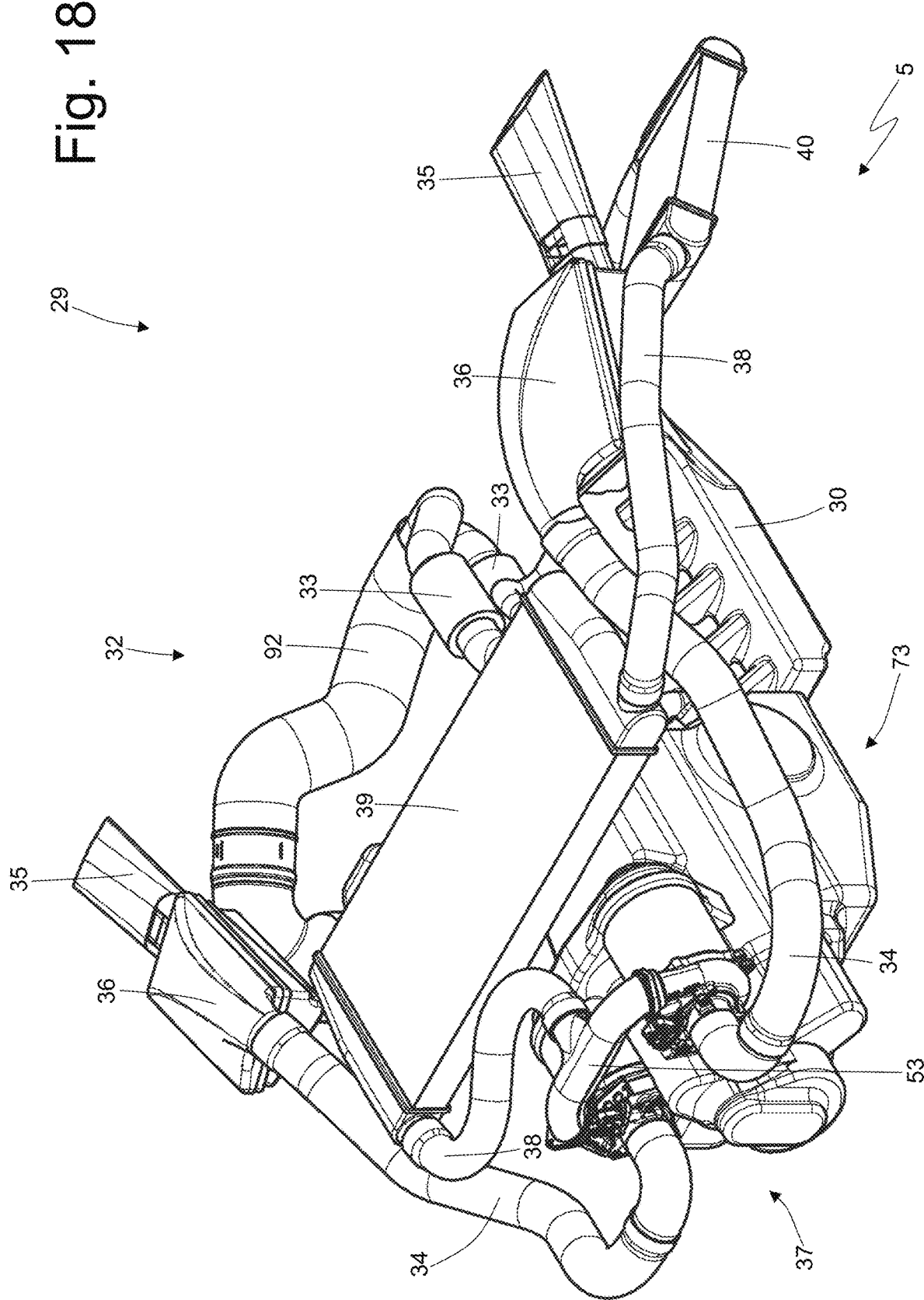
FIGS. 18-21 are two different perspective views, a top view and a bottom view, respectively, of an alternative embodiment of the internal combustion engine.
Figure 19:
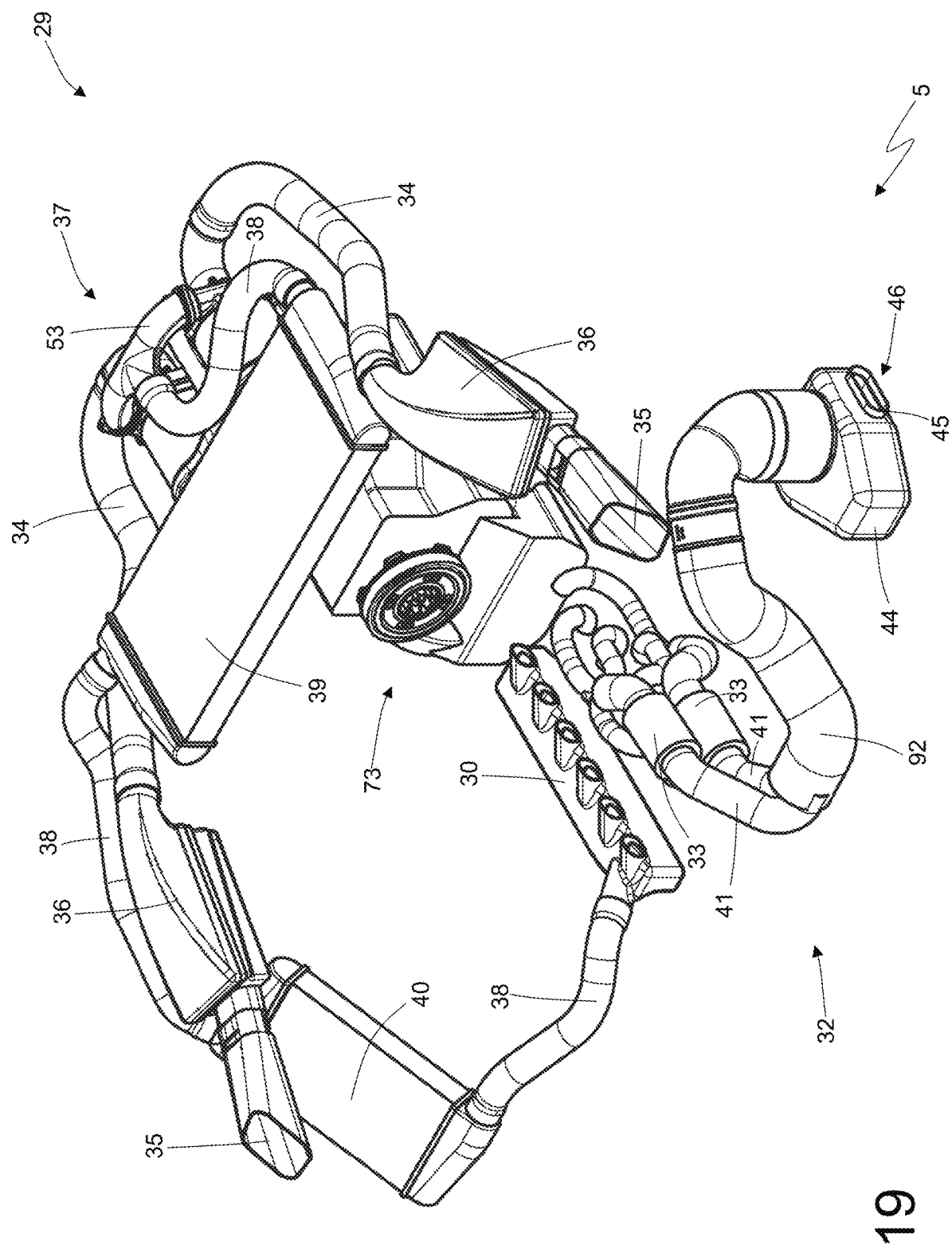
Figure 20:
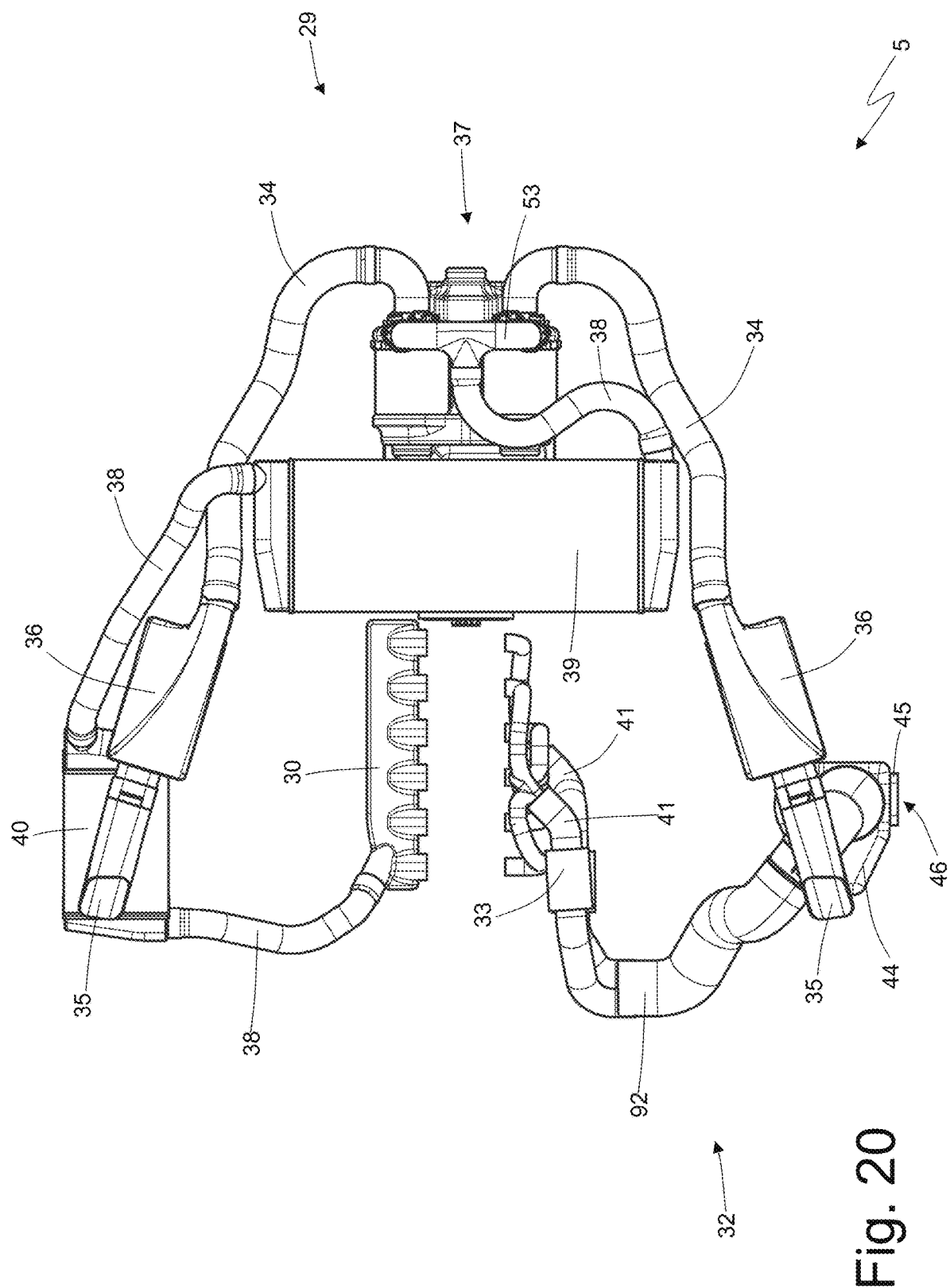
Figure 21:
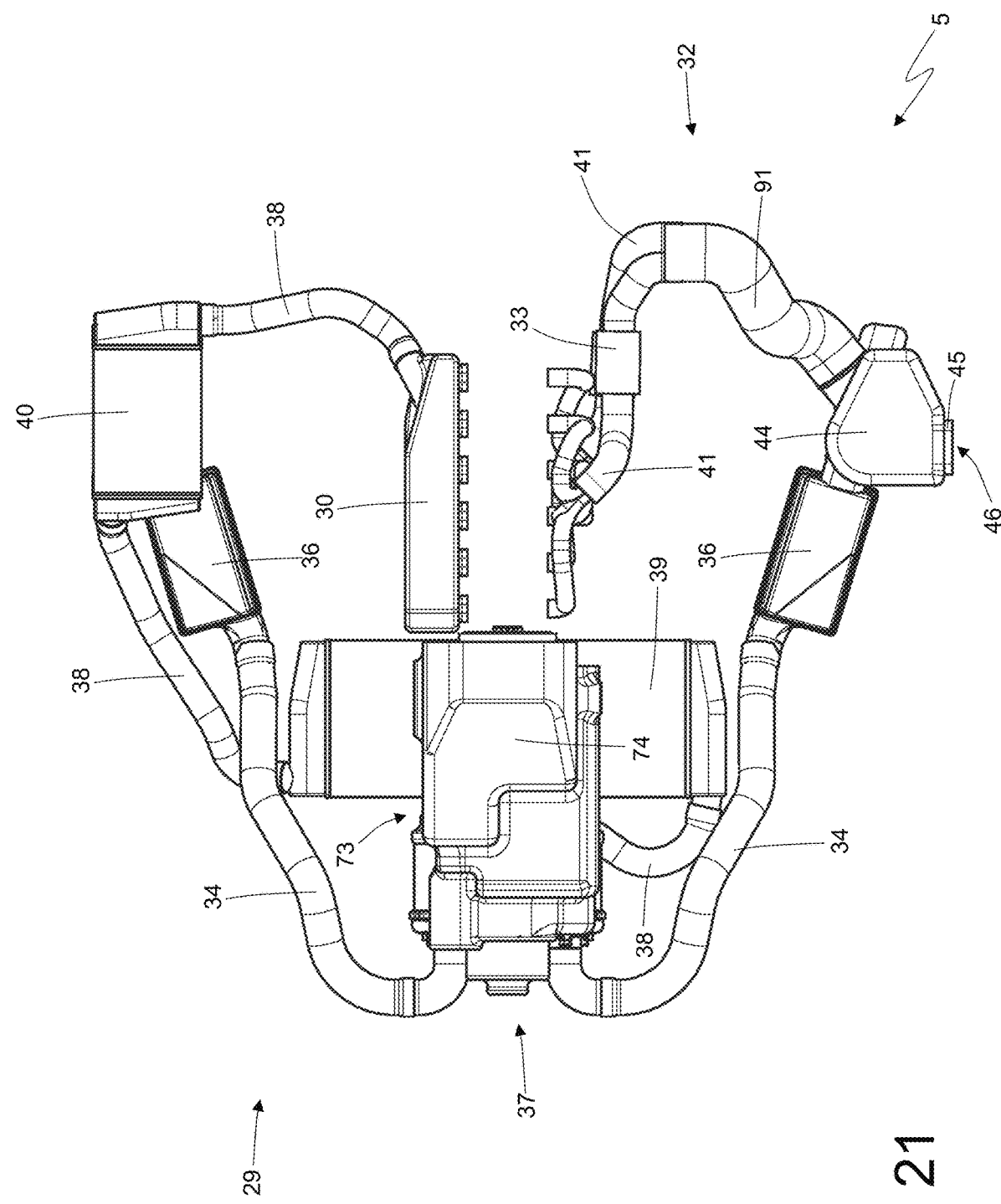

According to what is illustrated in FIG. 17, the turbine assembly 42 comprises two twin (identical) turbines 43 which together operate a same electric generator 54. In particular, the two turbines 43 are arranged side by side and have two respective axes of rotation 55 parallel to and spaced apart from one another. The turbine assembly 42 comprises a transmission device 56 which connects both turbines 43 to the same electric generator 54. The transmission device 56 comprises two gear wheels, each of which is integral with the shaft of a corresponding turbine 43 for receiving the rotary motion from the turbine 43, and a connection element (a toothed belt, a chain, a gear cascade) which connects the two gear wheels to one another so as to cause both gear wheels to rotate together and at the same rotation speed. According to a possible embodiment, one gear wheel of the two gear wheels of the transmission device 56 is directly constrained to a shaft of the electric generator 54 so that the electric generator 54 rotates at the same rotation speed of the two turbines 43; in alternative, one gear wheel of the two gear wheels of the transmission device 56 is connected to the shaft of the electric generator 54 by means of the interposition of a speed reducer (typically a reduction gear) so that the electric generator 54 rotates at a rotation speed lower than the rotation speed of the two turbines 43.

According to a preferred embodiment illustrated in the accompanying figures, the electric generator 54 is coaxial to a turbine 43; i.e. a turbine 43 and the electric generator 54 rotate around the same first axis of rotation 55, whereas the other turbine 43 rotates around a second axis of rotation 55 parallel to, and spaced apart from, the first axis of rotation 55.

The two turbines 43 are identical and are of centrifugal type. In particular, each turbine 43 comprises a radial inlet 57 connected to a side of respective exhaust duct 41 and an axial outlet 52 arranged on the opposite side of the transmission device 56 and connected to another side (which leads into the silencer 44) of the respective exhaust duct 41.

Figure 11:
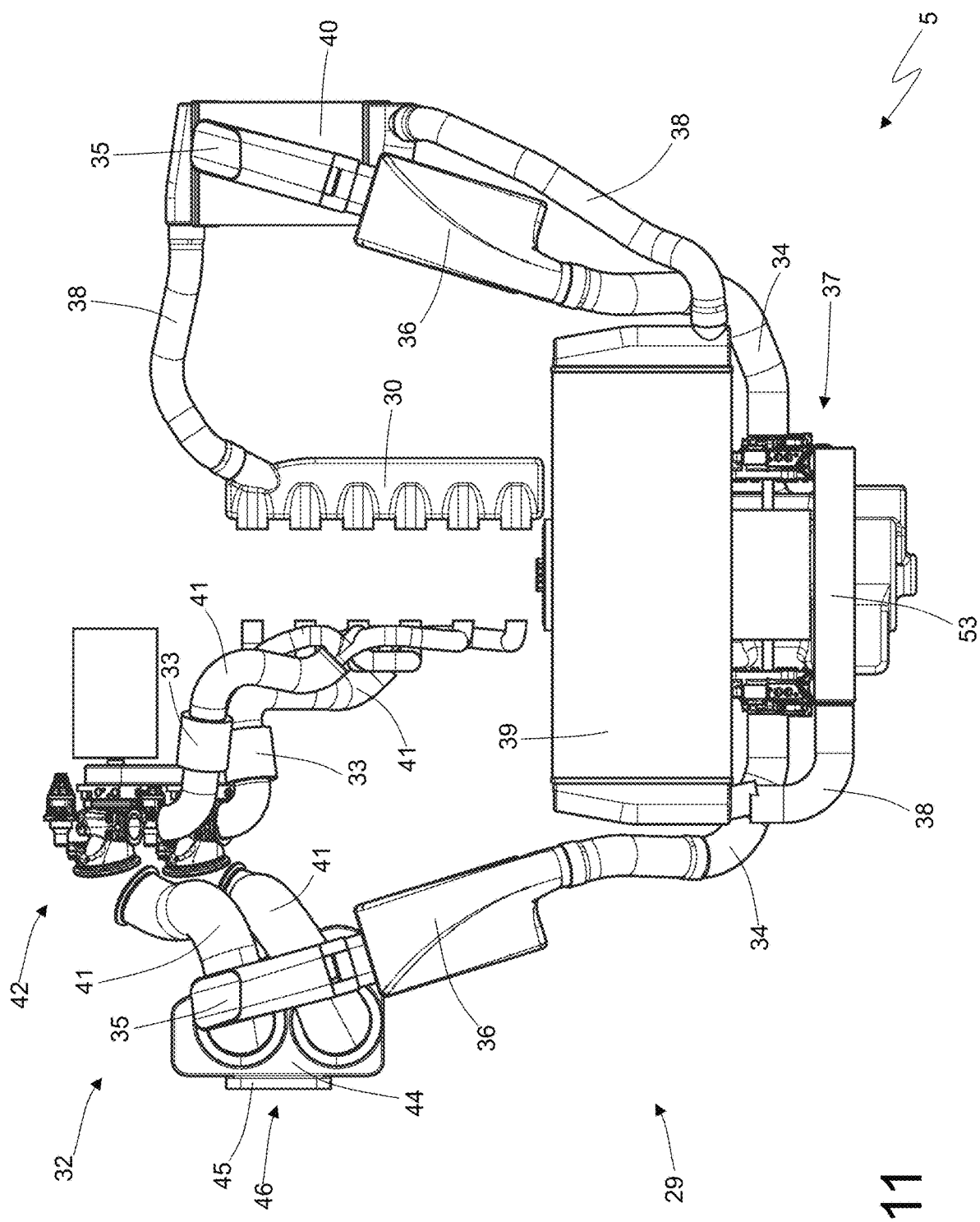
Figure 12:
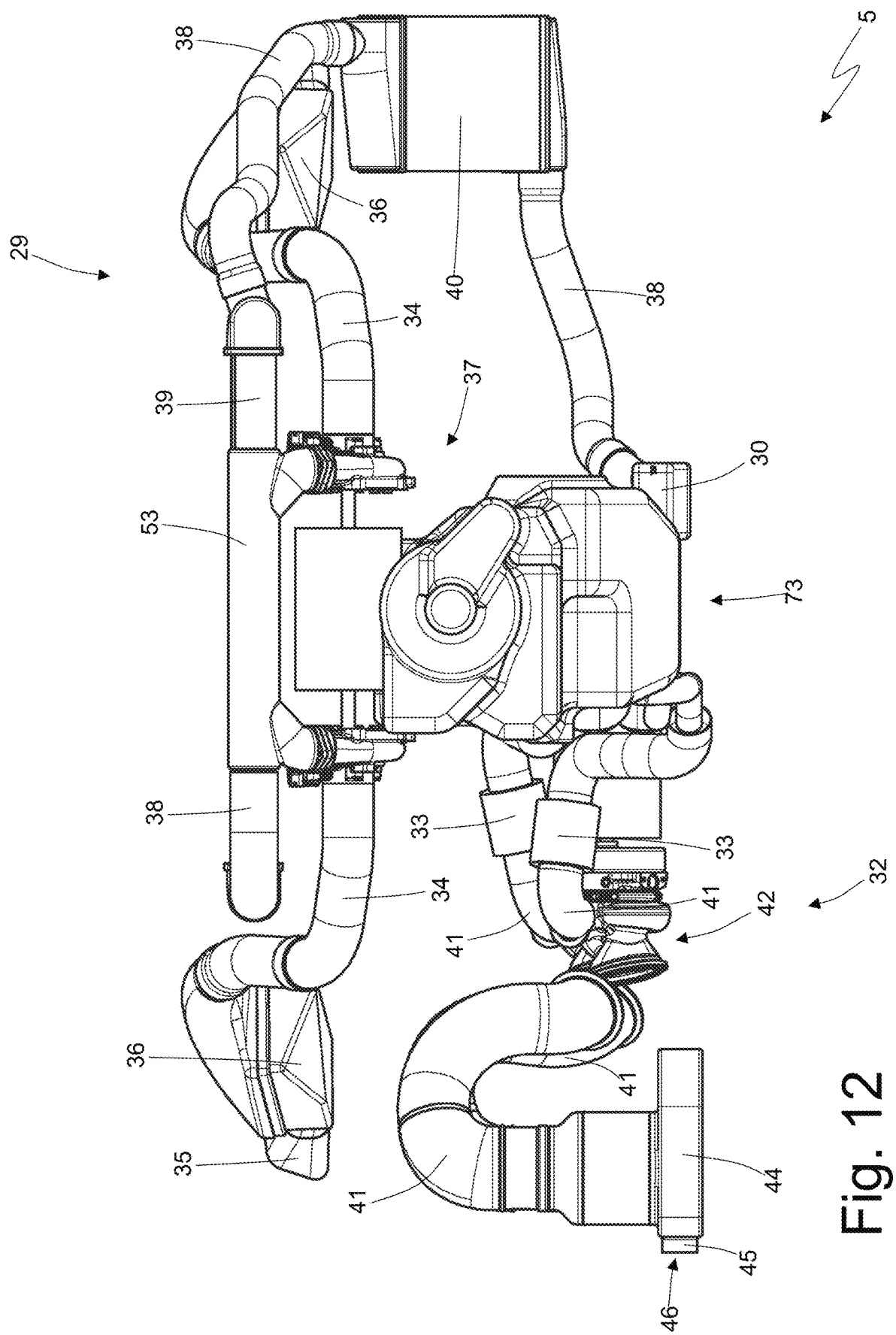

According to a preferred embodiment better illustrated in FIGS. 11 and 12, the silencer 41 is arranged next to an engine block (made up of the crankcase 17 and of the cylinder head 21) of the internal combustion engine 5 (on the side of the exhaust valves 25). The outlet opening 46 of the silencer 41 is obtained through a side of the car 1 (as is illustrated in FIG. 1) or, according to an alternative embodiment, through the bottom 14 of the car 1 (as is illustrated in FIG. 3).

In other words, the outlet opening 46 of the silencer 44 is arranged in an asymmetrical manner at only one side of the car 1 and is located between a rear wheel 4 and a door 13. According to a preferred embodiment, the outlet opening 46 of the silencer 44 is arranged on the side where the driving place 16 is located; in this manner the driver sitting in the driving place 16 is close to the outlet opening 46 of the silencer 44 and is thus in the best position for hearing in an optimal manner the noise diffused through the outlet opening 46 of the silencer 44.

In the embodiment illustrated in FIG. 1, the outlet opening 46 of the silencer 44 is obtained through a side of the bodywork 12, whereas in the alternative embodiment illustrated in FIG. 3, the outlet opening 46 of the silencer 44 is obtained through the bottom 14.

In the embodiment illustrated in the accompanying figures, the silencer 44 comprises one single outlet opening 46; according to other embodiments not illustrated, the silencer 44 comprises more outlet openings 46 which can be more or less side by side (possibly it is also possible for one outlet opening 46 of the silencer 44 to be obtained through a side of the bodywork 12, whereas for the other outlet opening 46 of the silencer 44 to be obtained through the bottom 14).

According to a preferred embodiment better illustrated in FIGS. 11 and 12, the silencer 44 is arranged on a side of the car 1 next to an engine block (made up of the crankcase 17 and of the cylinder head 21) of the internal combustion engine 5 and in front of a rear drive wheel 4.

According to a preferred embodiment better illustrated in FIGS. 11 and 12, the turbine assembly 42 is arranged next to an engine block (made up of the crankcase 17 and of the cylinder head 21) of the internal combustion engine 5 (on the side of the exhaust valves 25). In particular, the turbine assembly 42 is arranged between the internal combustion engine 5 (i.e. between the engine block made up of the crankcase 17 and of the cylinder head 21) and the silencer 44; in this manner, the exhaust ducts 41 are particularly short and relatively not very tortuous.

In the embodiment illustrated in FIGS. 9-12, the compressor assembly 37 (comprising the two twin compressors 49) is connected between the two intake ducts 34 and 38, is arranged behind the engine block (made up of the crankcase 17 and of the cylinder head 21) of the internal combustion engine 5, is arranged higher than the engine block of the internal combustion engine 5, and is operated by the electric motor 50.

According to what is better illustrated in FIGS. 9-12, the compressor assembly 37 (comprising the two twin compressors 49) is arranged at the rear behind the intercooler 39 (i.e. the two compressors 49 of the compressor assembly 37 are arranged at the rear behind the intercooler 39). The intercooler 39 is oriented horizontally and is arranged behind (at the rear of) the engine block (made up of the crankcase 17 and of the cylinder head 21) of the internal combustion engine 5; in particular, the intercooler 39 is arranged higher than the engine block of the internal combustion engine 5 and is located behind the engine block of the internal combustion engine 5. Whereas, the intercooler 40 (connected in series to the intercooler 39 along the intake duct 38) is arranged on a side of the car 1 next to the engine block (made up of the crankcase 17 and of the cylinder head 21) of the internal combustion engine 5 and in front of a rear drive wheel 4. In particular, the intercooler 40 is arranged on a side of the car 1 opposite the silencer 44; i.e. the intercooler 40 and the silencer 44 are arranged on the opposite sides of the car 1 separated from one another by the engine block (made up of the crankcase 17 and of the cylinder head 21) of the internal combustion engine 5. In other words, the intercooler 40 and the silencer 44 are arranged on the opposite sides of the engine block of the internal combustion engine 5.

Figure 28:
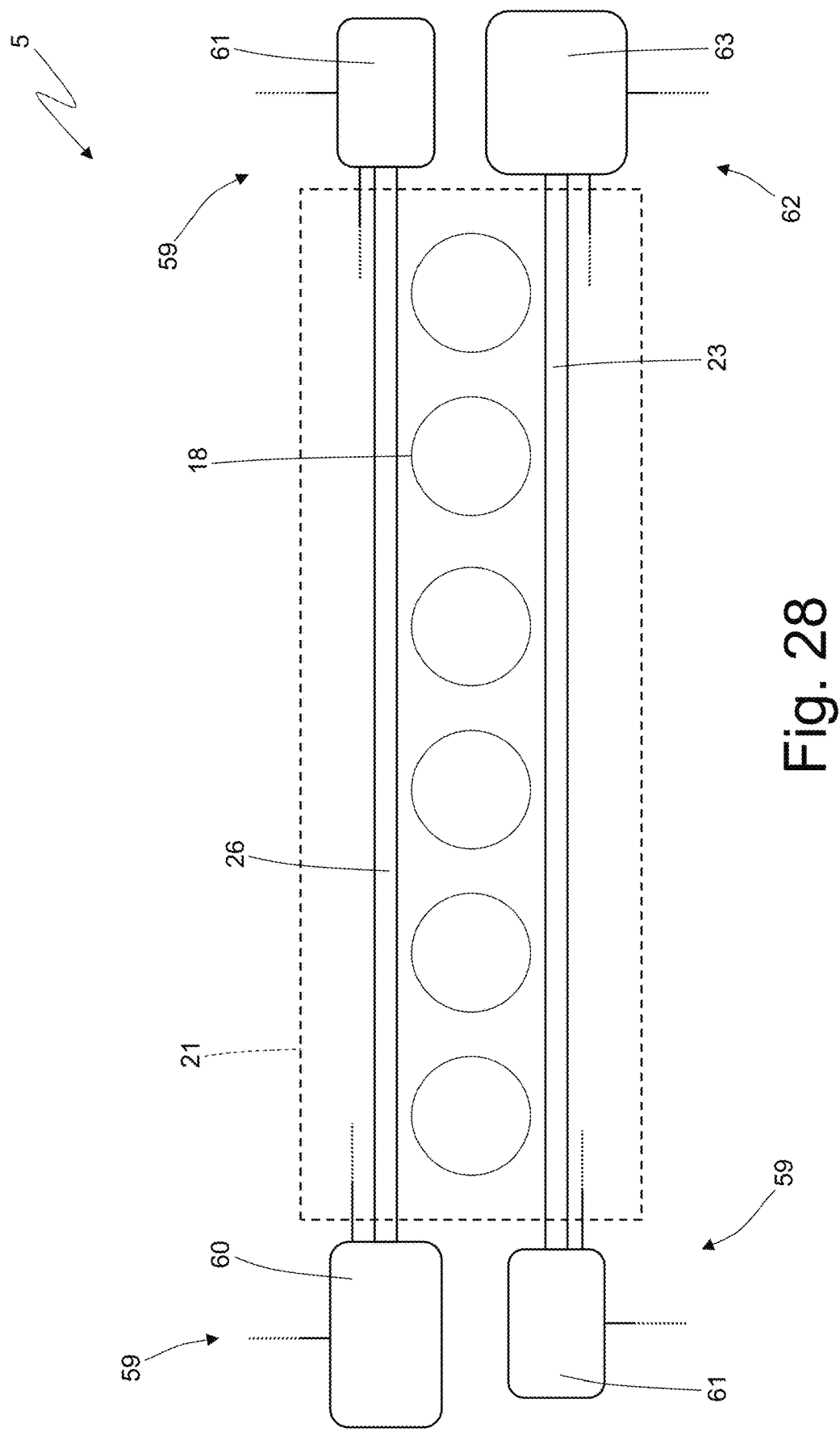

According to what is illustrated in FIG. 28, the internal combustion engine 5 comprises a dry-sump lubrication circuit 59 which causes a lubricant oil to circulate in all of the parts in movement of the internal combustion engine 5. The lubrication circuit 59 comprises a delivery lubrication pump 60 configured to cause the lubricant oil to circulate; i.e. the delivery lubrication pump 60 collects the lubricant oil from an oil tank for sending the lubricant oil inside the engine block (made up of the crankcase 17 and of the cylinder head 21). The lubrication circuit 59 comprises two recovery lubrication pumps 61 configured to cause the lubricant oil to circulate; i.e. each recovery pump 61 collects the oil from the engine block (made up of the crankcase 17 and of the cylinder head 21) and in particular from the lower part of the engine block and thus from the cylinder head 21 for sending the lubricant oil into the tank (which is arranged higher than the cylinder head 21).

According to a preferred embodiment, the two recovery lubrication pumps 61 are arranged on opposite sides of the cylinder head 21, so as to draw the lubrication oil from areas opposite the cylinder head 21.

According to what is illustrated in FIG. 28, the internal combustion engine 5 comprises a cooling circuit 62 which causes a coolant liquid (for example a mixture of water and glycol) to circulate in the engine block (made up of the crankcase 17 and of the cylinder head 21) of the internal combustion engine 5. The cooling circuit 62 comprises a cooling pump 63 configured to cause the coolant liquid to circulate.

Figure 27:
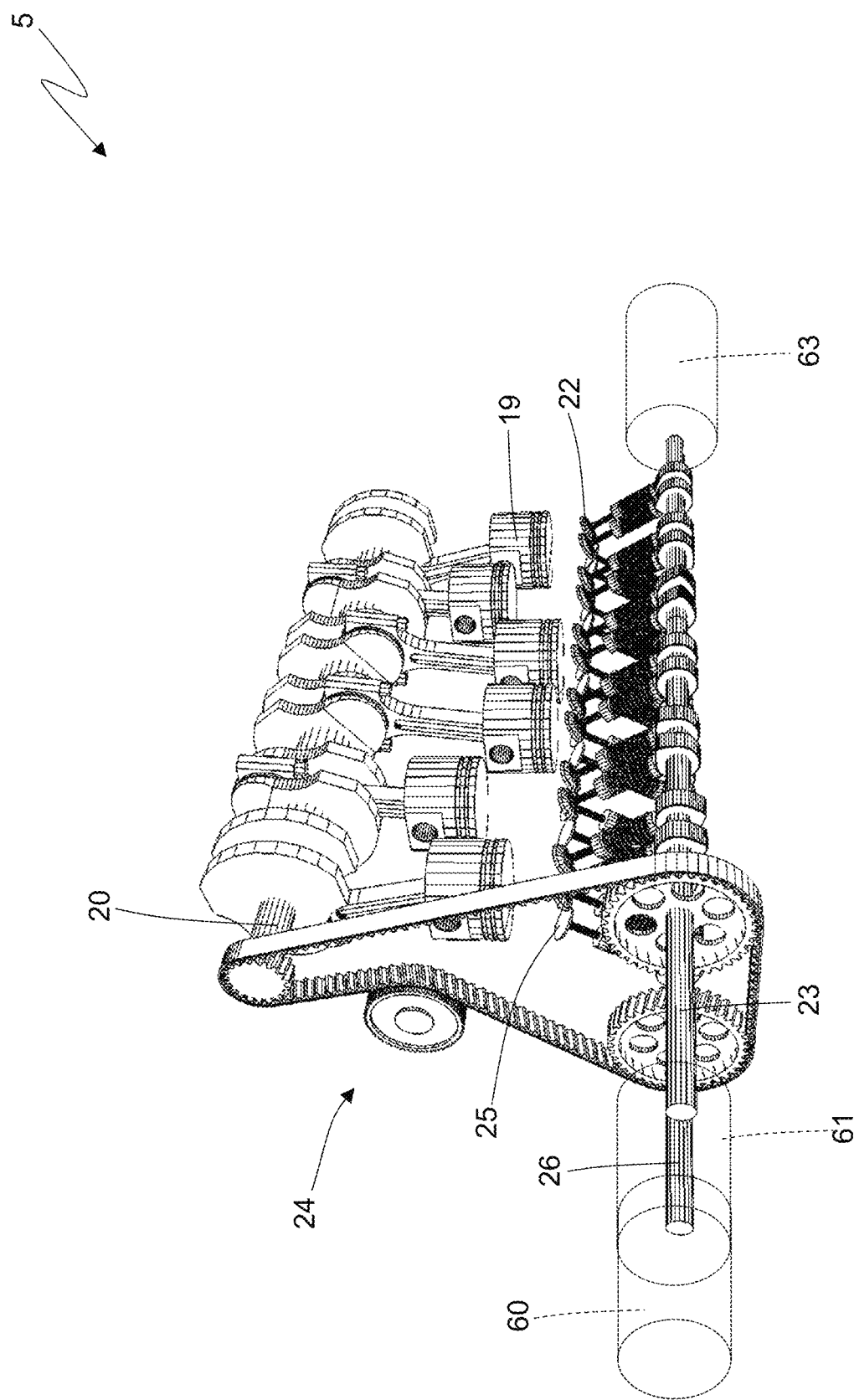
FIGS. 27 and 28 are a perspective view and a schematic view, respectively, of two camshafts of the internal combustion engine within evidence the arrangement of lubrication pumps and of a cooling pump.

According to what is illustrated in FIGS. 27 and 28, the camshaft 23 axially projects out of the cylinder head 21 on both sides: a lubrication pump 61 is coaxial to the camshaft 23 and is directly connected to the camshaft 23 so as to be caused to rotate by the camshaft 23 and similarly the cooling pump 63 is coaxial to the camshaft 23 on the opposite side of the lubrication pump 61 and is directly connected to the camshaft 23 so as to be caused to rotate by the camshaft 23.

According to what is illustrated in FIGS. 27 and 28, the camshaft 26 axially projects out of the cylinder head 21 on both sides: the other lubrication pump 61 (different from the lubrication pump 61 connected to the camshaft 23) is coaxial to the camshaft 26 and is directly connected to the camshaft 26 so as to be caused to rotate by the camshaft 26 and similarly the lubrication pump 60 is coaxial to the camshaft 26 on the opposite side of the lubrication pump 61 and is directly connected to the camshaft 26 so as to be caused to rotate by the camshaft 26.

In this manner, all four pumps 60, 61 and 63 are coaxial to the respective camshafts 23 and 26 and are directly caused to rotate by the respective camshafts 23 and 26.

According to other embodiments not illustrated, the number of pumps 60, 61 and 63 is different (less) since, for example, only one delivery lubrication pump 61 could be provided; in this case a (at least one) camshaft 23 or 26 axially projects out of the cylinder head 21 on only one side.

According to other embodiments not illustrated, the arrangement of the pumps 60, 61 and 63 could be different, i.e. could vary: for example the cooling pump 63 could be connected to the camshaft 26 or the lubrication pump 60 could be connected to the camshaft 23.

According to what is illustrated in FIG. 15, the gearbox 7 is directly connected to the drive shaft 20 of the internal combustion engine 5, is aligned with the internal combustion engine 5, and is arranged behind the internal combustion engine 5. In particular, the gearbox 7 is vertically aligned with an upper part of the engine block of the internal combustion engine 5; i.e. the gearbox 7 is vertically aligned with the upper part of the crankcase 17.

The gearbox 7 is a double clutch gearbox and is interposed between the drive shaft 20 of the internal combustion engine 5 and the rear drive wheels 4. The gearbox 7 comprises a basket 64 which is caused to rotate by the drive shaft 20 and two clutches 65 accommodated next to one another in the basket 64 for getting the motion from the basket 64. Furthermore, the gearbox 7 comprises two primary shafts 66 which are coaxial to one another, are inserted inside one another, and are each connected to a corresponding clutch 65 for receiving the motion from the corresponding clutch 65. Each clutch 65 comprises drive plates which are integral with the basket 64 (thus always rotate together with the drive shaft 20 to which the basket 64 is constrained) and driven plates which are interleaved to the drive plates and are integral with the corresponding primary shafts 66 (thus always rotate together with the corresponding primary shafts 66).

The basket 64 of the gearbox 7 having double clutch 65 is arranged on the opposite side of the internal combustion engine 5 (i.e. of the drive shaft 20) with respect to the two primary shafts 66; furthermore, the gearbox 7 having double clutch 65 comprises a transmission shaft 67 which connects the drive shaft 20 to the basket 64, is coaxial to the two primary shafts 66, and is inserted inside the two primary shafts 66. In other words, the transmission shaft 67 ends at an end wall of the basket 64 and is constrained to the end wall of the basket 64. In particular, a first primary shaft 66 is arranged on the outside, the transmission shaft 67 is arranged on the inside, and the other (second) primary shaft 66 is arranged between the transmission shaft 67 and the first primary shaft 66. In other words, from the inside towards the outside there is the transmission shaft 67 (which is in the centre) and in succession the two primary shafts 66 (which are inserted inside one another and both surround the transmission shaft 67).

According to a preferred embodiment illustrated in the accompanying figures, the primary shafts 66 and the transmission shaft 67 of the gearbox 7 are coaxial to the drive shaft 20 of the internal combustion engine 5; i.e. the internal combustion engine 5 is aligned with the gearbox 7.

The gearbox 7 having double clutch 65 comprises a single secondary shaft 68 connected to the differential 8 which transmits the motion to the rear drive wheels 4; according to an alternative and equivalent embodiment, the double clutch gearbox 7 comprises two secondary shafts 68 both connected to the differential 8. From the differential 8 a pair of axle shafts 69 depart, each of which is integral with a rear drive wheel 4.

The gearbox 7 has seven forward gears indicated by Roman numerals (first gear I, second gear II, third gear III, fourth gear IV, fifth gear V, sixth gear VI and seventh gear VII) and a reverse gear (indicated by the letter R). Each primary shaft 66 and the secondary shaft 68 are mechanically coupled to one another by means of a plurality of gears, each of which defines a respective gear and comprises a primary gear wheel 70 mounted on the primary shaft 66 and a secondary gear wheel 71 mounted on the secondary shaft 68. In order to allow the correct operation of the gearbox 7, all the odd gears (first gear I, third gear III, fifth gear V, seventh gear VII) are coupled to a same primary shaft 66, whereas all the even gears (second gear II, fourth gear IV, and sixth gear VI) are coupled to the other primary shaft 66.

Each primary gear wheel 70 is splined to a respective primary shaft 66 for always rotating in an integral manner with the primary shaft 66 and meshes in a permanent manner with the respective secondary gear wheel 71; whereas, each secondary gear wheel 71 is idle mounted on the secondary shaft 68. Furthermore, the gearbox 7 comprises four double synchronisers 72, each of which is mounted coaxial to the secondary shaft 68, is arranged between two secondary gear wheels 19, and is adapted to be actuated for alternatively engaging the two respective secondary gear wheels 19 with the secondary shaft 68 (i.e. for alternatively making the two respective secondary gear wheels 19 angularly integral with the secondary shaft 68). In other words, each synchroniser 72 can be moved in one direction for engaging a secondary gear wheel 71 with the secondary shaft 68, or can be moved in the other direction for engaging the other secondary gear wheel 71 with the secondary shaft 68.

Figure 13:
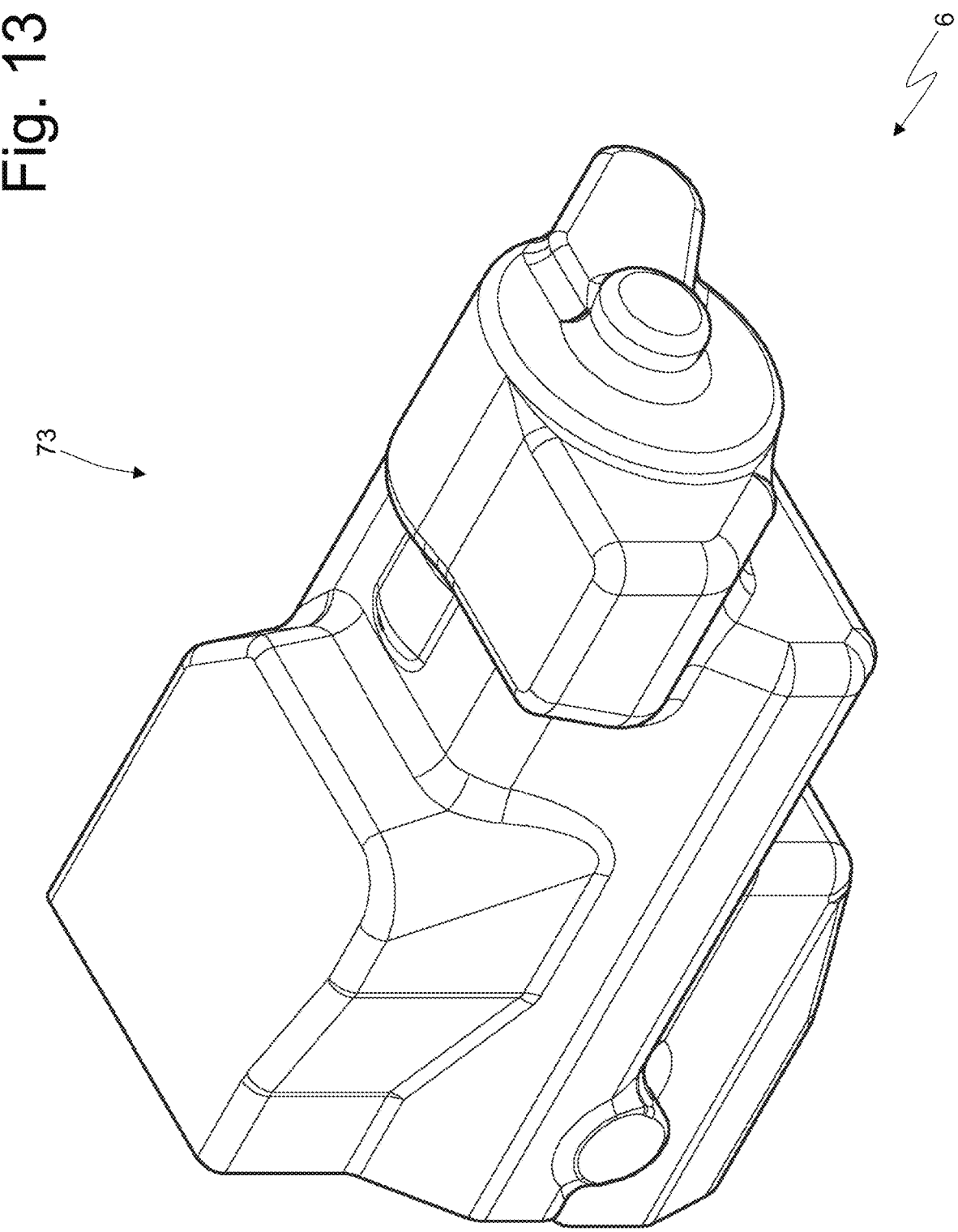
FIGS. 13 and 14 are a perspective view and a side view, respectively, of a transmission system of the car of FIG. 1.
Figure 14:
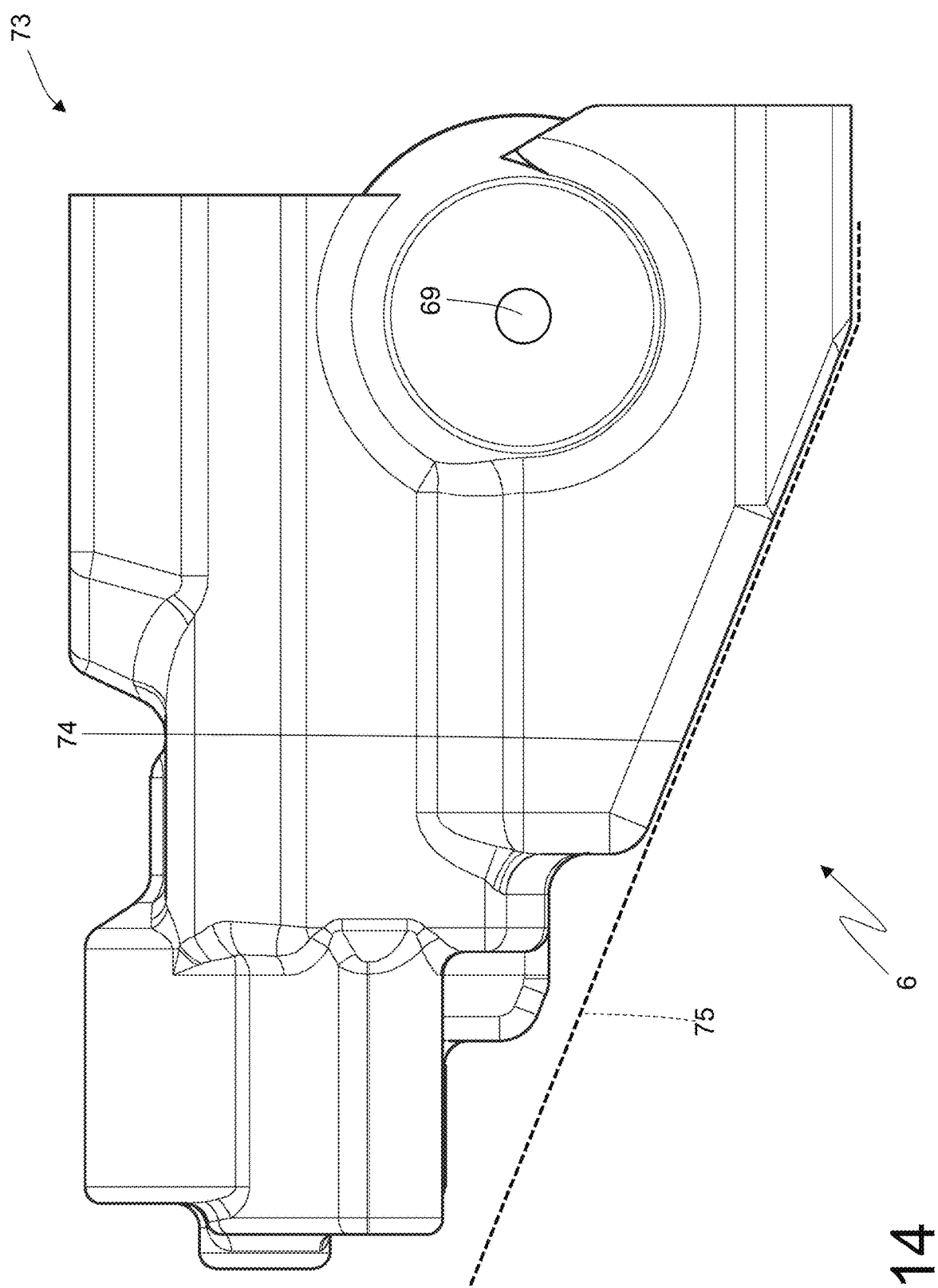

According to what is illustrated in FIGS. 13 and 14, the car 1 comprises an accommodation body 73 which accommodates on its inside (also) the double clutch gearbox 7 and has a shape which is tapered towards the rear so that the height of the accommodation body 73 progressively reduces from the front to the rear. In other words, a front wall of the accommodation body 73 is more developed in height than a rear wall of the accommodation body 73. In particular, the accommodation body 73 has at the bottom a bottom wall 74 which is inclined with respect to the horizontal due to the tapered shape of the accommodation body 73.

The differential 8 (which receives the motion from the secondary shaft 68 of the gearbox 7 and transmits the motion to the two rear drive wheels 4 by means of the two respective axle shafts 69) is arranged inside the accommodation body 73 in front position and under the gearbox 7. The two axle shafts 69 laterally come out of the accommodation body 73.

Based on what described above, it is possible to summarise that the gearbox 7 is directly connected to the drive shaft 20 of the internal combustion engine 5, is aligned with the internal combustion engine 5 (i.e. the primary shafts 66 and the transmission shaft 67 of the gearbox 7 are coaxial to the drive shaft 20 of the internal combustion engine 5), and is arranged behind the internal combustion engine 5; furthermore, the intercooler 39 is horizontally arranged on top of the gearbox 7 (i.e. on top of the accommodation body 37 in which the gearbox 7 is located).

Figure 7:
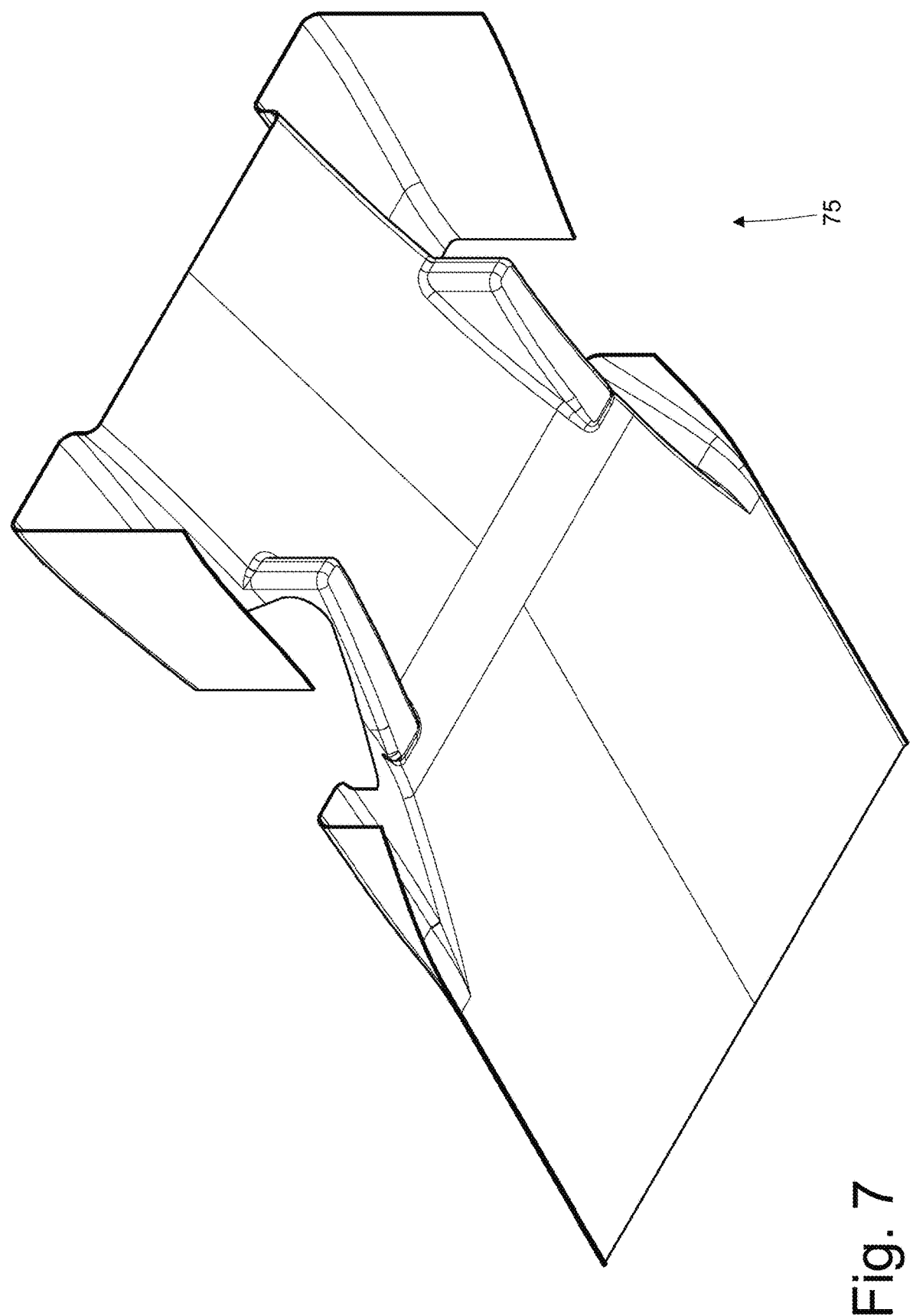
FIGS. 7 and 8 are a perspective view and a side view, respectively, of an aerodynamic extractor of the car of FIG. 1.
Figure 8:
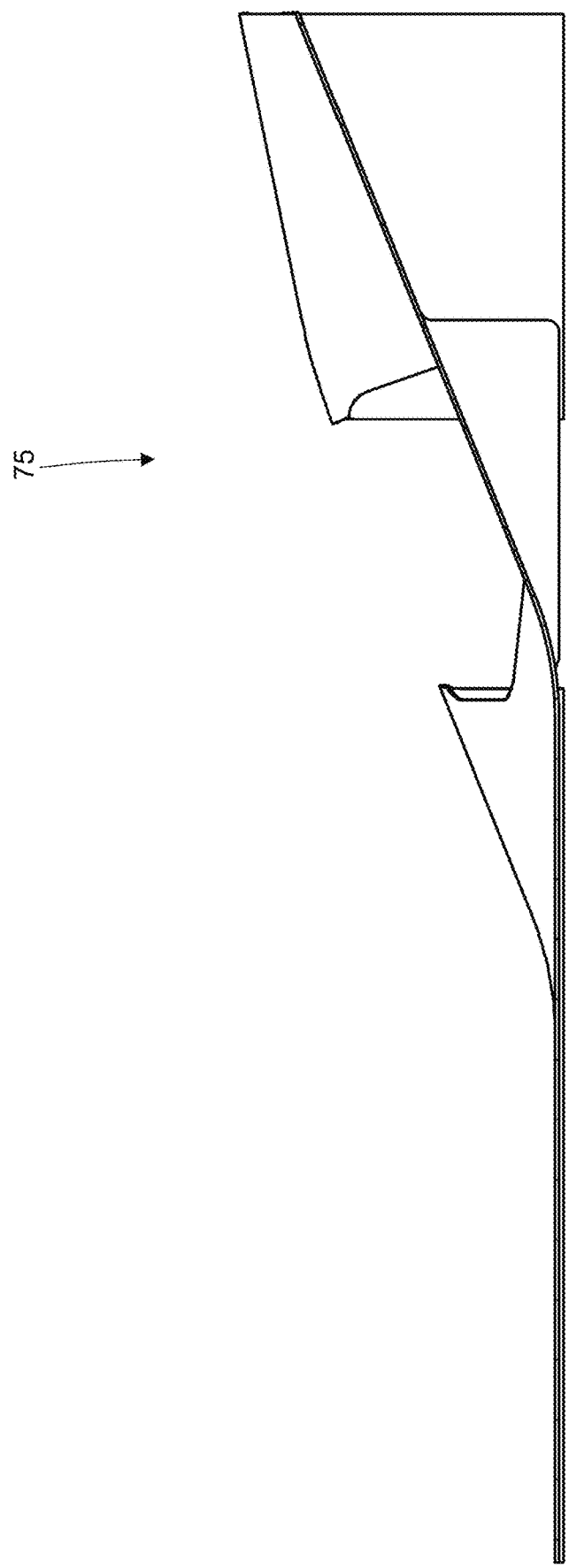
Figure 9:
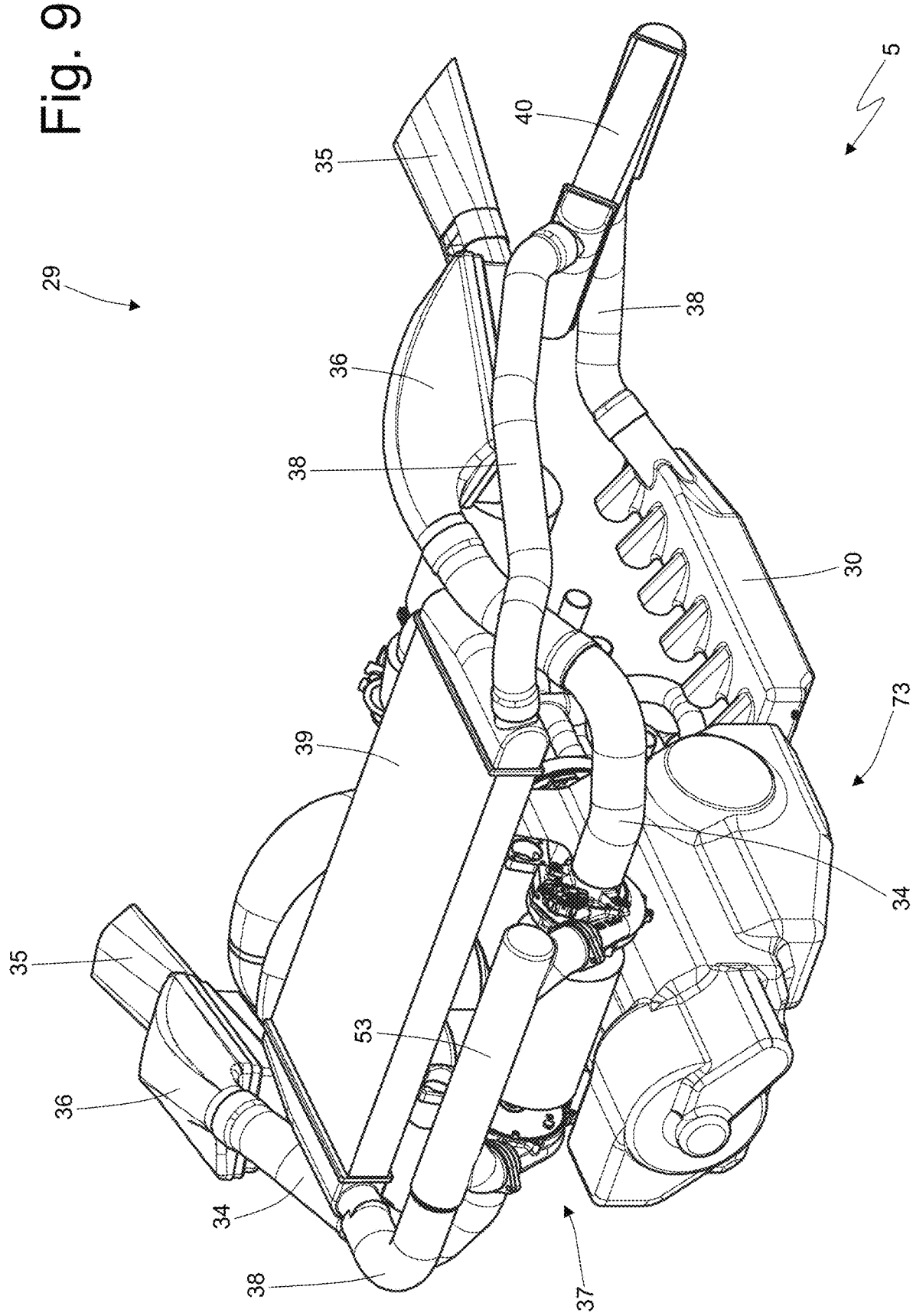
FIGS. 9-12 are two different perspective views, a top view and a rear view, respectively, of the internal combustion engine.
Figure 10:
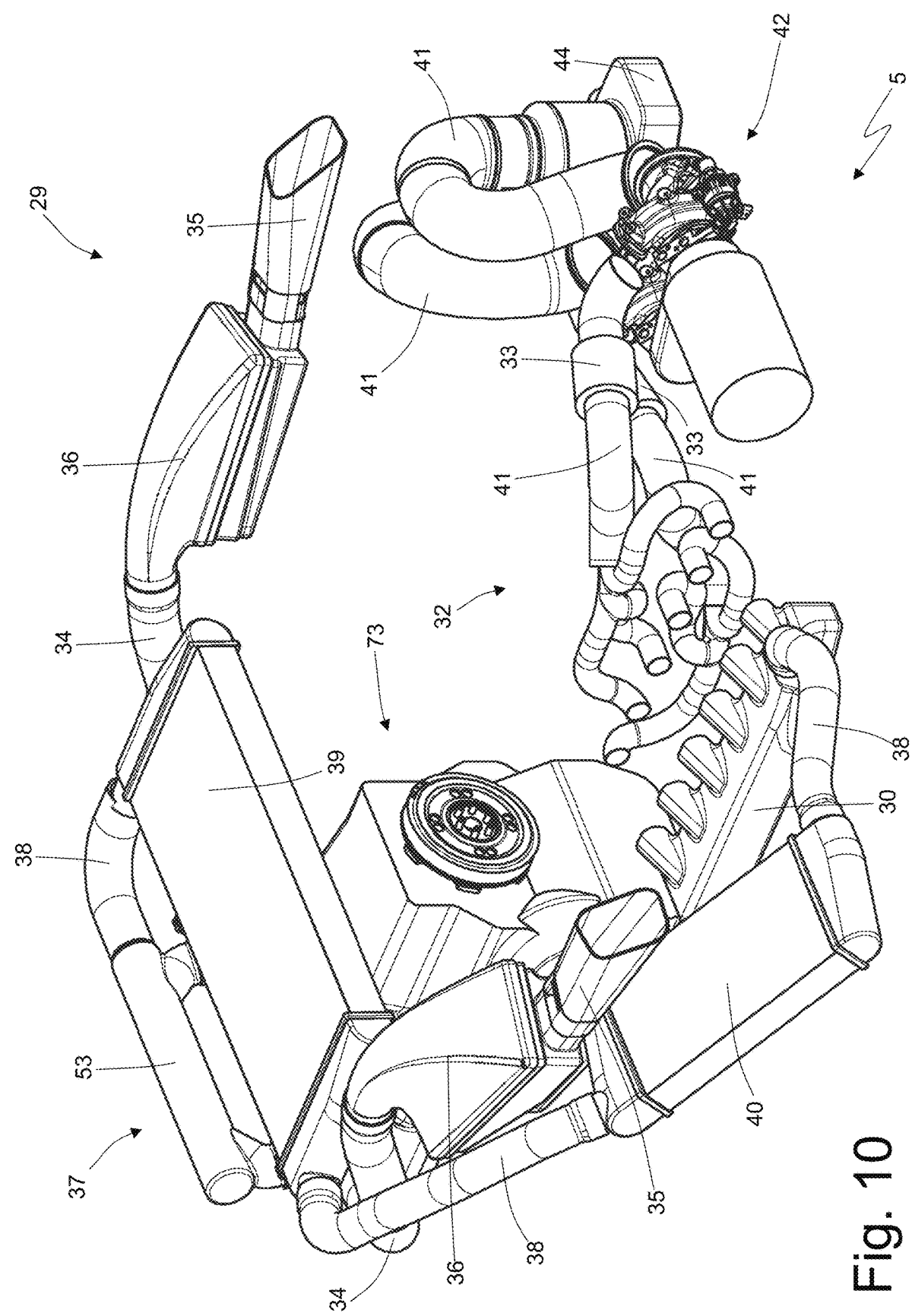

According to what is illustrated in FIGS. 3, 7 and 8, the car 1 comprises a rear aerodynamic extractor 75 which faces the roadbed 14, starts at a rear wall of the engine block (made up of the crankcase 17 and of the cylinder head 21) of the internal combustion engine 5 and is arranged under the gearbox 7 (i.e. under the accommodation body 73 in which the gearbox 7 is located).

Figure 6:
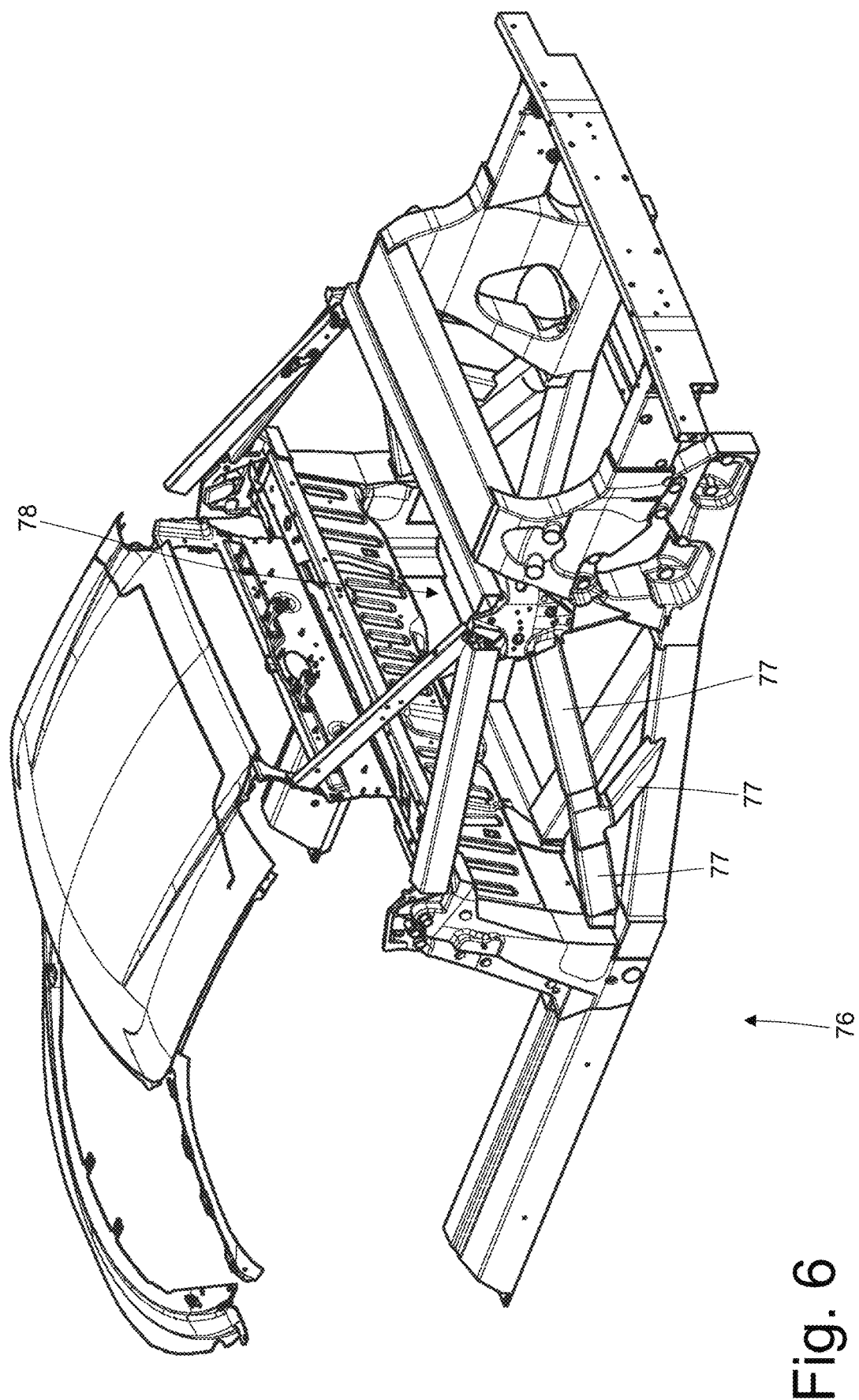
FIG. 6 is a perspective view, with parts removed for clarity, of a chassis of the car of FIG. 1.

According to a preferred embodiment, the bottom wall 74 of the accommodation body 73 (inside which the gearbox 7 is located) has the same inclination of the rear aerodynamic extractor 75; i.e. the bottom wall 74 of the accommodation body 73 reproduces the shape of the rear aerodynamic extractor 75 having the same inclination thereof. In this manner, the rear aerodynamic extractor 75 exploits all the space at disposal under the gearbox 7 (i.e. under the accommodation body 73 in which the gearbox 7 is located). According to what is illustrated in FIG. 6, the car 1 comprises a chassis 76 (partially illustrated in FIG. 6). The rear part of the chassis 76 comprises side bars 77 which are arranged at the spherical tanks 15 for protecting the spherical tanks 15 from the side impacts; the side bars 77 create tetrahedrons so as to have a greater resistance against the impacts.

According to what is illustrated in FIG. 6, inside the chassis 76 an engine compartment 78 is obtained in which the internal combustion engine 5 is arranged. According to what is illustrated in FIG. 3, the bottom 14 of the car 1 comprises an opening 79 which is arranged at the engine compartment 78 and a demountable panel 80 which is fixed in a removable manner and closes the opening 79. The opening 79 has a dimension similar to a dimension of the engine compartment 78; i.e. the dimension of the opening 79 is approximately (as much as possible) equal to the dimension of the engine compartment 78 so that through the opening 79 there can be a complete access to the engine compartment 78.

According to a preferred embodiment, the demountable panel 80 is at least partially transparent; in particular, the demountable panel 80 centrally has a transparent window 81 (for example, made of glass). The function of the transparent window 81 is essentially technical since it allows to visually inspect the internal combustion engine 5 without having to remove the demountable panel 80.

According to a preferred embodiment, the bodywork 12 does not have any openable hood (arranged on top of the engine compartment 78) which allows the access to the engine compartment 78; i.e. the access to the engine compartment 78 occurs only from the bottom through the opening 79 since the upper part of the engine compartment 78 is permanently closed by fixed and non-removable panels of the bodywork 12.

According to a preferred embodiment, the demountable panel 80 is directly fixed to the chassis 76 by means of a plurality of screws 82 (preferably quarter-turn screws 82).

The rear aerodynamic extractor 75 faces the roadbed 14, is arranged at the rear of the demountable panel 80, and borders with the demountable panel 80. In other words, the rear aerodynamic extractor 75 starts where the demountable panel 80 ends. Also the aerodynamic extractor 75 is demountable for allowing a simpler access to the accommodation body 73 of the gearbox 7.

In the embodiment illustrated in FIGS. 9-12, the turbine assembly 42 which generates electric energy by means of the electric generator 54 is provided and the compressor assembly 37 operates the two compressors 49 by means of the electric motor 50 which utilises (at least in part) the electric energy generated by the electric generator 54 of the turbine assembly 42.

In the embodiment illustrated in FIGS. 18-21, the turbine assembly 42 is not provided and the compressor assembly 37 is devoid of the electric motor 50 since the two compressors 49 are operated by the gearbox 7 collecting the motion from the basket 64 of the clutches 65 of the gearbox 7 (as it will be better explained in the following). In other words, the two compressors 49 are operated by the transmission shaft 67 of the gearbox 7 (which causes the basket 64 of the clutches 65 to directly rotate and is directly connected to the drive shaft 20). This embodiment is a little less efficient energetically (not recovering part of the energy of the exhaust gases through the turbine assembly 42) but is lighter, more compact and simpler as it totally eliminates the electrical part (in fact, neither the electric generator 54 of the turbine assembly 42, nor the electric motor 50 of the compressor assembly 37 are present).

According to what is illustrated in FIGS. 22-26, an actuation system 83 is present which connects the basket 64 of the gearbox 7 to the compressor assembly 37 (i.e. to the two compressors 49 of the compressor assembly 37) so as to get the motion from the basket 64 of the gearbox 7 for causing the two compressors 49 of the compressor assembly 37 to rotate. By way of example, the actuation system 83 increases the rotation speed so that the two compressors 49 of the compressor assembly 37 rotate increasingly faster than the basket 64 of the gearbox 7; for example, the two compressors 49 of the compressor assembly 37 could rotate 7-8 times faster than the basket 64 of the gearbox 7.

According to what is illustrated in FIG. 15, the actuation system 83 is connected to an end wall of the basket 64 of the gearbox 7 on the opposite side of the transmission shaft 67; i.e. the basket 64 of the gearbox 7 has an end wall which on one side is connected to the transmission shaft 67 and on the opposite side is connected to the actuation system 83.

Figure 24:
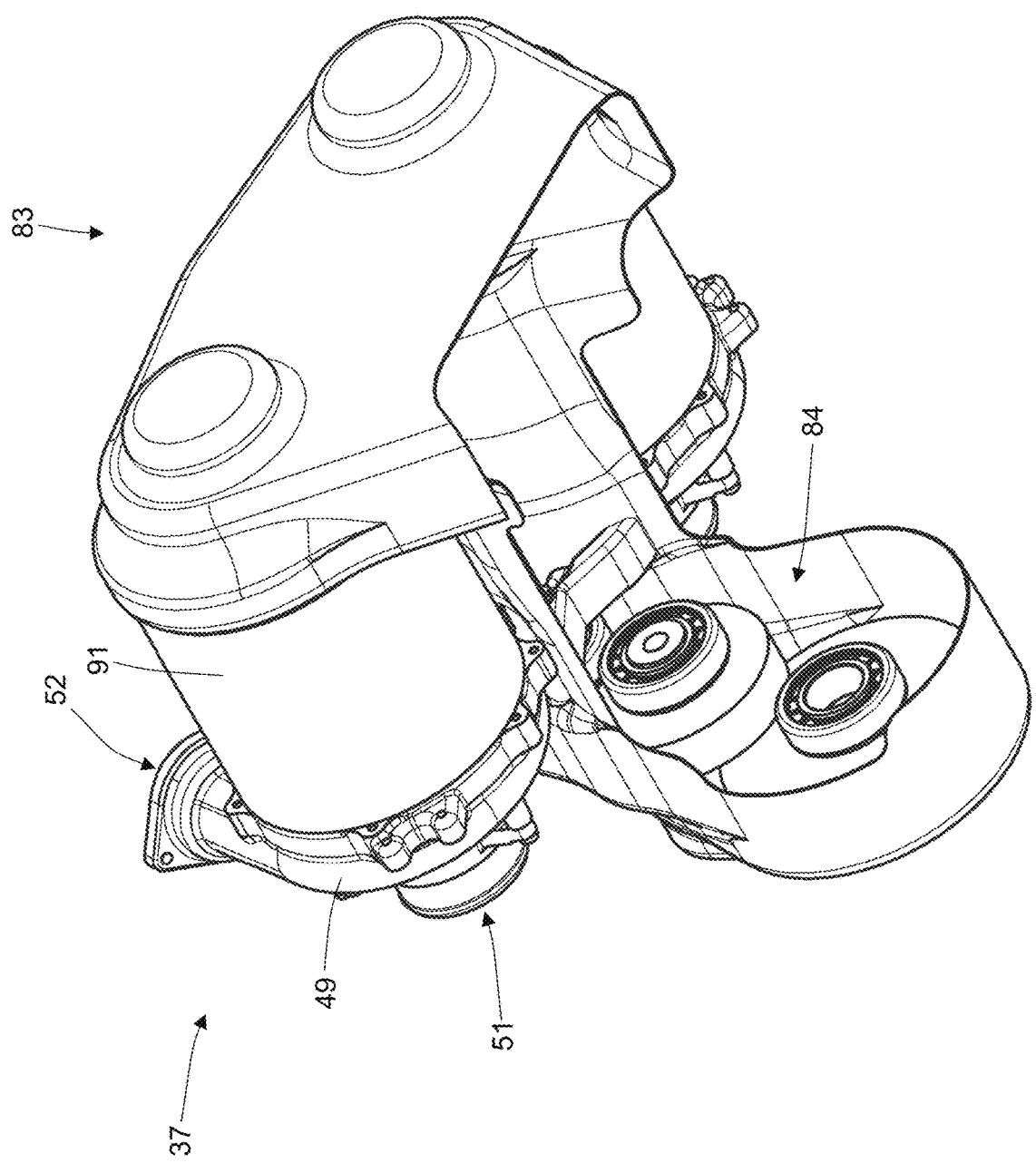
FIGS. 24 and 25 are two different perspective views of the compressor assembly of FIGS. 22 and 23 and of a corresponding actuation system.

According to a possible embodiment schematically illustrated in FIG. 24, the actuation system 83 comprises a variator device 84 which is interposed between the basket 64 of the gearbox 7 and the compressors 49 and has a variable transmission ratio. Preferably, the variator device 84 has a centrifugal activation so as to autonomously modify the transmission ratio depending on the rotation speed of the basket 64 of the gearbox 7; in particular, the variator device 84 is configured to decrease the transmission ratio upon the increase of the rotation speed of the basket 64 of the gearbox 7. In other words, when the rotation speed of the basket 64 of the gearbox 7 is lower, the transmission ratio is greater and thus (the rotation speed of the basket 64 being equal) the compressors 49 turn faster, whereas when the rotation speed of the basket 64 of the gearbox 7 is higher, the transmission ratio is smaller and thus (the rotation speed of the basket 64 being equal) the compressors 49 turn slower; in this manner, the compressors 49 manage to generate an effective compression also when the basket 64 of the gearbox rotates slowly without "going over-speed" when the basket 64 of the gearbox rotates fast.

According to a preferred embodiment, the variator device 84 has only two different transmission ratios; by way of example, the two transmission ratios obtainable by means of the variator device 84 could differ from one another by 30-40%.

According to a preferred embodiment, the variator device 84 comprises a direct drive engaged by a centrifugal clutch and a planetary gear train which produces a transmission ratio less than the direct drive: the centrifugal clutch is operated by the centrifugal force which compresses the plates of the clutch engaging the direct drive when the rotation speed of the basket 64 of the gearbox 7 exceeds a threshold value (thus determine a reduction of the transmission ratio when the rotation speed of the basket 64 of the gearbox 7 exceeds the threshold value). According to a preferred embodiment, a transmission ratio of the variator device 84 could correspond to a direct drive (i.e. a transmission ratio 1:1), whereas the other transmission ratio could be comprised between 1:1.3 and 1:1.4.

According to a preferred embodiment, the variator device 84 is connected to the basket 64 of the gearbox 7 on the opposite side of the primary shafts 66 and of the transmission shaft 67.

In the embodiment illustrated in FIGS. 22-26, the two compressors 49 are arranged parallel to and spaced apart from one another so as to rotate around two axes of rotation 85 which are parallel to and spaced apart from one another and are parallel to an axis of rotation 86 of the basket 64 of the gearbox 7 (which is coaxial to the primary shafts 66, to the transmission shaft 67, and to the drive shaft 20). In particular, the axis of rotation 86 of the basket 64 of the gearbox 7 is arranged between the axes of rotation 85 of the two compressors 49; i.e. the two compressors 49 are arranged on the two opposite sides of the axis of rotation 86 of the basket 64 of the gearbox 7.

Figure 26:
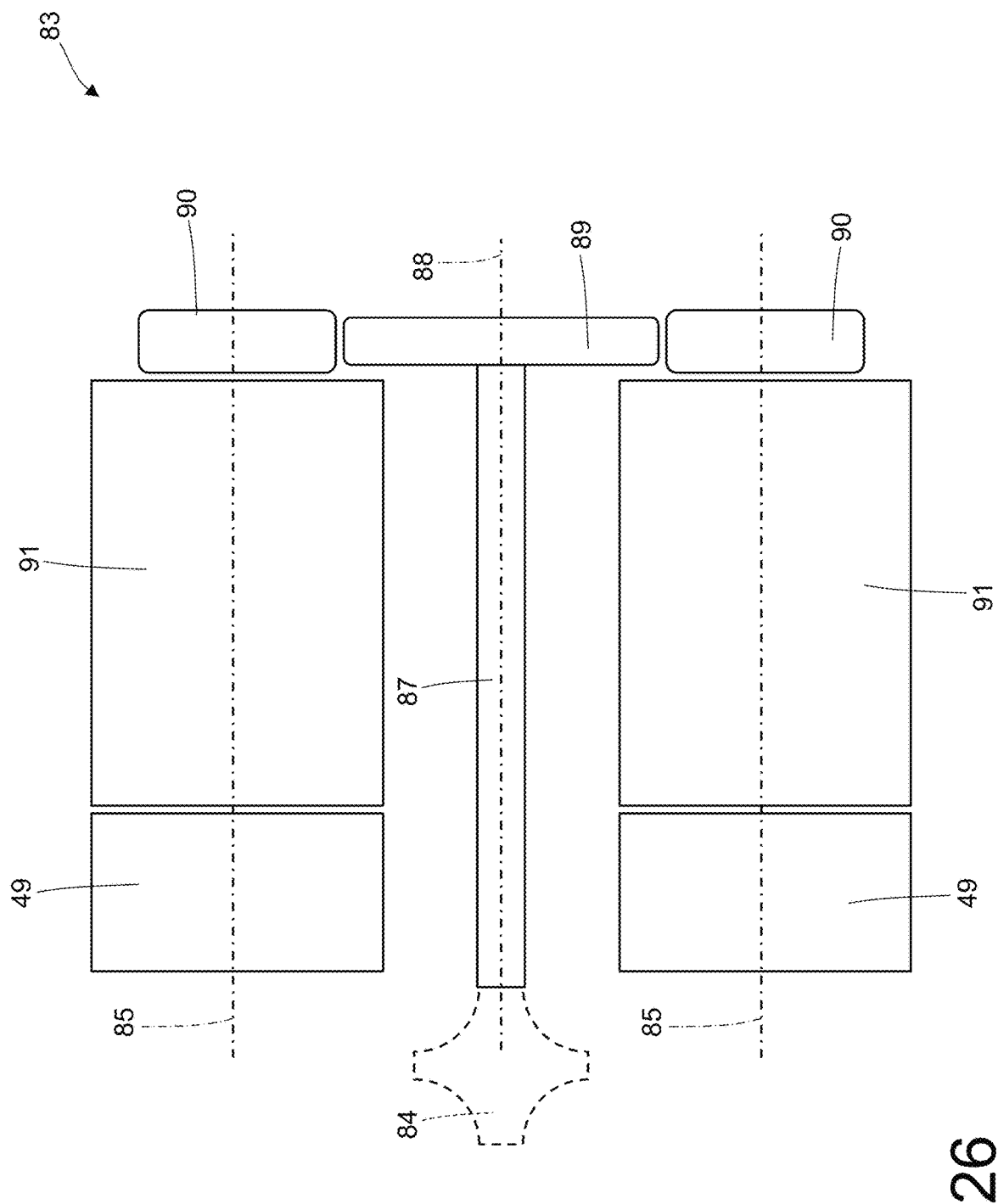
FIG. 26 is a schematic view of part of the actuation system of FIGS. 24 and 25.

According to a preferred embodiment illustrated in FIG. 26, the actuation system 83 comprises an intermediate shaft 87 which receives the motion from the basket 64 of the gearbox 7 and rotates around an axis of rotation 88 which is parallel to and spaced apart from the axis of rotation 86 of the basket 64 of the gearbox 7. In particular, the variator device 84 is interposed between the basket 64 of the gearbox 7 and the intermediate shaft 87. The actuation system 83 comprises a central gear wheel 89 which receives the motion from the intermediate shaft 87 (i.e. is constrained to the intermediate shaft 87) and two side gear wheels 90 which are arranged at the two sides of the central gear wheel 89, mesh with the central gear wheel 89 and each transmit the motion towards a corresponding compressor 49 (i.e. each side gear wheel 90 is constrained to a shaft of a corresponding compressor 49). Between each side gear wheel 90 and the corresponding compressor 49, a transmission 91 is interposed which increases the rotation speed, so that the compressor 49 can rotate faster than the side gear wheel 90.

On the whole, the compressors 49 rotate much faster than the drive shaft 20 (i.e. than the basket 64 of the gearbox 7): approximately, the compressors 49 rotate about ten times faster than the drive shaft 20 (i.e. the compressors 49 can reach 100,000 rpm, whereas the drive shaft 20 can reach 10,000 rpm).

Figure 22:
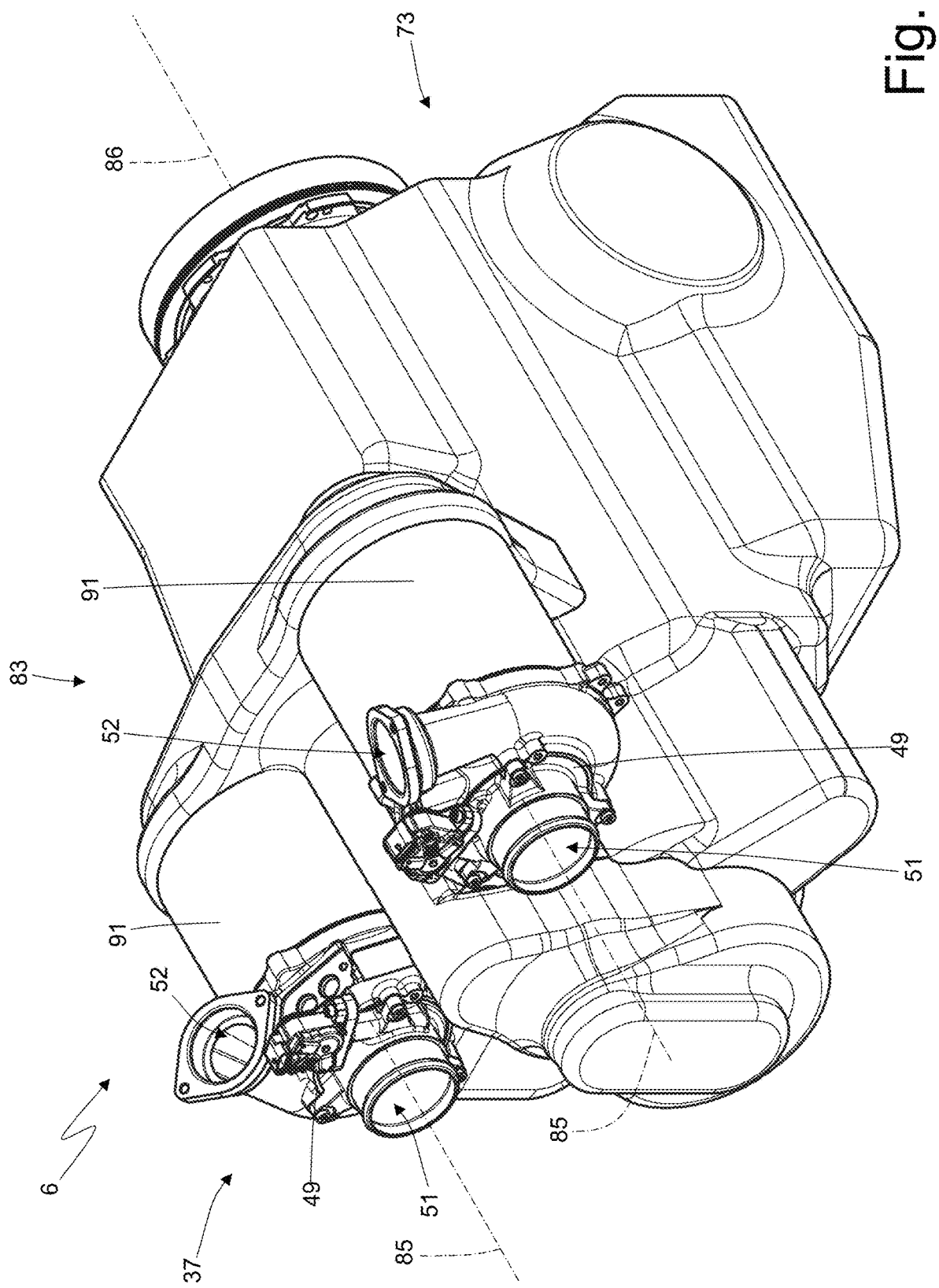
FIGS. 22 and 23 are a perspective view and a rear view, respectively, of a transmission system and of a compressor assembly coupled to the internal combustion engine of FIGS. 18-21.
Figure 23:
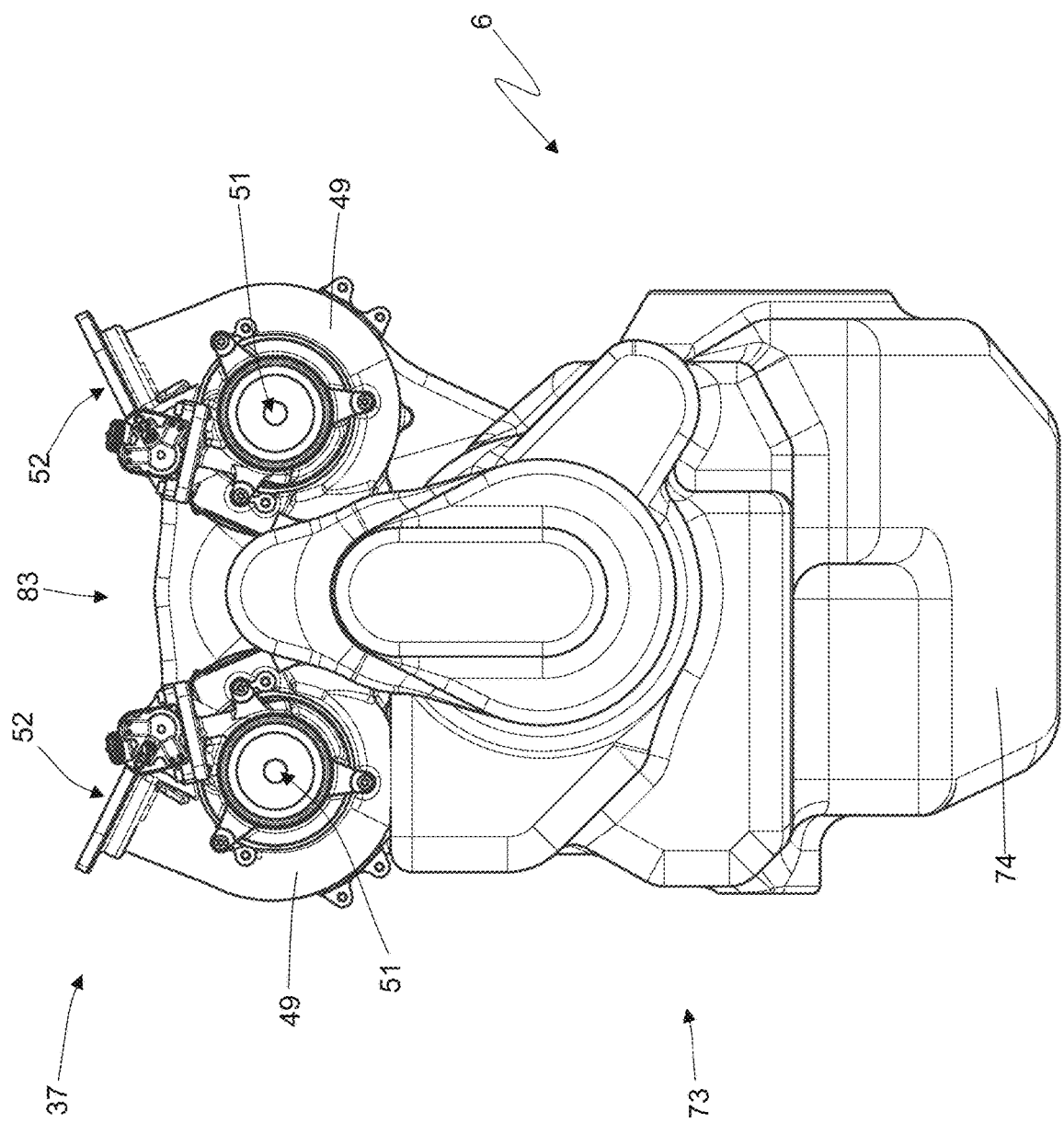
Figure 25:
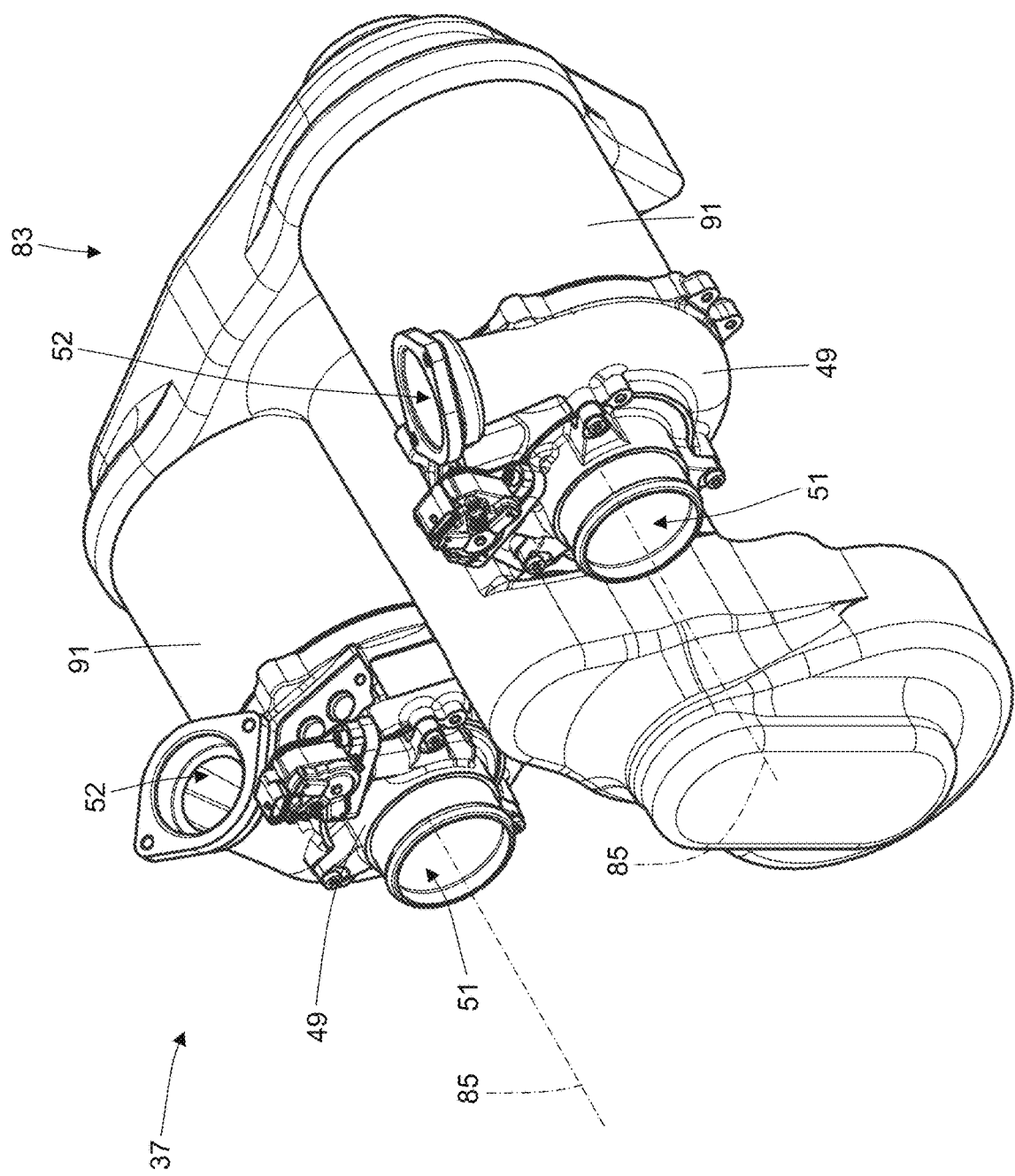

According to what is illustrated in FIGS. 22 and 25, each compressor 49 comprises an axial inlet 51 arranged on the opposite side of the actuation system 83 and a radial outlet 52. As described in the foregoing, the connection duct 53 is provided (not illustrated in FIGS. 22-25) which is connected to both outlets 52 of the two compressors 49 for receiving and joining the air compressed by both compressors 49.

In the embodiment illustrated in FIGS. 9-12, two exhaust ducts 41 are provided which originate from the cylinders 18 and end in the silencer 44 and are completely separated and independent from the cylinders 18 to the silencer 44. Whereas, in the embodiment illustrated in FIGS. 18-21, an exhaust duct 92 is provided, in which both exhaust ducts 41 converge and ends in the silencer 44; i.e. the exhaust ducts 41 join to one another upstream of the silencer 44 converging together in the exhaust duct 92 which engages in the silencer 44. In other words, the exhaust system 32 comprises one single exhaust duct 92 which receives the exhaust gases from both exhaust ducts 41; i.e. the two exhaust ducts 41 join for converging towards the single exhaust duct 92. The exhaust duct 92 starts in the convergence of the two exhaust ducts 41 and ends in the silencer 44.

In the embodiment illustrated in the accompanying figures, the compressor assembly 37 comprises two twin compressors 49; according to a different embodiment not illustrated, the compressor assembly 37 comprises one single compressor 49.

In the embodiment illustrated in the accompanying figures, the turbine assembly 42 (when present) comprises two twin turbines 43; according to a different embodiment not illustrated, the turbine assembly 42 (when present) comprises one single turbine 43.

The embodiments described herein can be combined with one another without departing from the scope of protection of the present invention.

The above-described car 1 has numerous advantages.

Firstly, the above-described car 1 allows simultaneously combining a large capacity of storing hydrogen (being thus able to offer a satisfactory autonomy) with a very high dynamic performance thanks to an optimal wheelbase, an optimal overall weight, and an optimal distribution of the weights. These results are obtained thanks to the particular configuration and arrangement of the internal combustion engine 5 and of the transmission system 6 which allow creating a significant free space for housing the tanks 9 and 10 of hydrogen without penalising the dynamic performance of the car 1.

The above-described car 1 allows manufacturing a rear aerodynamic chute (extractor) having extremely significant dimensions thus allowing the generation of a very significant aerodynamic load without any penalisation of the drag.

In the above-described car 1, it is possible to hear inside the passenger compartment 15 (particularly in the driving place 16 where the driver is seated) an exhaust noise which has both a sufficiently high intensity, and an optimal sound quality; this result is obtained thanks to the fact that the outlet opening is very close to the passenger compartment 15 and on the side of the driving place 16, since this solution allows both "concentrating" the sound intensity in the proximity of the passenger compartment 15, and having an exhaust noise which is very natural (i.e. not created or anyway modified in an artificial manner). In other words, the exhaust noise is not artificially "shot" towards the passenger compartment 15 through non-natural transmission channels, but, on the contrary, the exhaust noise reaches the passenger compartment 15 only passing through the exhaust system, i.e. following the natural outlet path of the exhaust noise.

In the above-described car 1, also thanks to the particular configuration of the double clutch gearbox 7 in which the basket 64 is arranged on the opposite side of the internal combustion engine, it is possible to obtain a placing of all the elements of the powertrain system particularly favourable (i.e. compact still being very functional) for reducing to the minimum the length of the wheelbase (i.e. the distance between the front axle and the rear axle).

In the above-described car 1, also thanks to the particular configuration of the compressor assembly 37 in which the two twin compressors 49 are coaxial to the opposite sides of the electric motor 50, it is possible to obtain a placing of all the elements of the powertrain system particularly favourable (i.e. compact still being very functional); at the same time, the presence of two twin compressors 49 allows compressing particularly high airflow rates.

In the above-described car 1, also thanks to the particular configuration of the turbine assembly 42 in which the two twin turbines 42 are arranged side by side for operating a same common electric generator 54, it is possible to obtain a placing of all the elements of the powertrain system particularly favourable (i.e. compact still being very functional); at the same time the presence of two twin turbines 42 allows recovering a high quantity of energy from the exhaust gas.

In the above-described car 1 (in particular in the embodiment illustrated in FIGS. 18-26), the geometry of the intake ducts 34 and 38 is optimal both for bulk, and for load losses even without having to recur to an electric actuation of the compressor assembly 37; this result is obtained by collecting the motion necessary for causing the two compressors 49 of the compressor assembly 37 to rotate directly from the basket 64 of the double clutch gearbox 7 which is in a very favourable position for the positioning of the compressor assembly 37.

In the above-described car 1, the particular configuration and the particular positioning of the two intercoolers 39 and 40 allow maximising the effectiveness and the efficiency of the cooling of the compressed air without requiring too stringent constraints on the placing of all the other components of the internal combustion engine 5.

In the above-described car 1, the aerodynamic extractor 75 has a very significant dimension (thus allows generating a significant aerodynamic load against a modest increase in the drag) even if the internal combustion engine 5 is placed in central/rear position (thus having an optimal distribution of the masses between front axle and rear axle) and, at the same time, the wheelbase is relatively short (i.e. the car 1 has an extremely performing dynamic behaviour). This result is obtained by placing the internal combustion engine 5 with the drive shaft 20 arranged at the top: in this manner, also the gearbox 7 can be arranged higher consequently freeing in the bottom part of the rear zone of the car the necessary space for housing the aerodynamic extractor 75 having a very significant dimension.

In the above-described car 1, the possibility to access all the zones of the internal combustion engine 5 is optimal and complete; this result is obtained thanks to the possibility to access from the bottom which, once the car 1 is lifted, always allows an operator to position himself/herself exactly under the component on which to intervene. In other words, the possibility to access the internal combustion engine 5 from the bottom makes the maintenance easy and simple, since the operators are not limited by the outline of the car 1 but can easily move in all of the zones of the internal combustion engine 5 being the car 1 lifted.

In the above-described car 1, the fact that the removable panel is at least partially transparent constitutes, besides an undoubted technical advantage as explained in the foregoing, an aesthetic innovation and makes the removable panel also an aesthetic element; it is important to observe that thanks to the aerodynamic extractor 75 having large dimensions, it is relatively easy to see at least part of the internal combustion engine 5 through the transparent part of the removable panel without having to bend in an excessive manner.

In the above-described car 1, the bodywork 12 is particularly rigid and resistant thanks to the complete absence of an opening for the access to the engine compartment 78 (and normally closed by a hood). In this manner, the rigidity being equal, it is possible to reduce the overall mass of the bodywork 12. Furthermore, the absence of an opening for the access to the engine compartment 78 also makes the bodywork 12 completely continuous (i.e. without interruptions) thus reducing the drag coefficient. The possibility to eliminate through the bodywork 12 an opening for the access to the engine compartment 78 is given by the fact that the internal combustion engine 5 does not require any maintenance in the upper part (made up of the crankcase 17) and consequently it is no longer necessary to access the engine compartment 78 from the top. In fact, all of the main components of the internal combustion engine 5 are in the lower part of the engine compartment 78 and are easily accessible from the bottom 14 through the opening 79 closed by the demountable panel 80.

In the above-described car 1, the lubrication pumps 60 and 61 and the cooling pump 63 have an optimal placing which allows minimising the number of components necessary for causing the pumps 60, 61 and 63 to rotate and, at the same time, allows maintaining reduced the load losses in the lubrication circuit 59 and in the cooling circuit 62. In other words, the grouping and the simultaneous operation by means of the two camshafts 23 and 26 of the four pumps 60, 61 and 63 makes the solution more cost-effective, lighter and more compact with respect to the known solutions currently on the market.

LIST OF THE REFERENCE NUMERALS OF THE FIGURES 1 car
2 front wheels
3 electrical machine
4 rear wheels
5 internal combustion engine
6 transmission system
7 gearbox
8 rear differential
9 passenger compartment
10 driving place
11 steering wheel
12 bodywork
13 doors
14 bottom
15 tank
16 tank
17 crankcase
18 cylinders
19 pistons
20 drive shaft 21 cylinder head
22 intake valves
23 camshaft
24 belt transmission
25 exhaust valves
26 camshaft
27 fuel injector
28 spark plug
29 intake system
30 intake collector
31 throttle valve
32 exhaust system
33 treatment device
34 intake ducts
35 air inlets
36 air filter
37 compressor assembly
38 intake duct
39 intercooler
40 intercooler
41 exhaust ducts
42 turbine assembly
43 turbine
44 silencer
45 final pipe
46 outlet opening
47 shaft
48 axis of rotation
49 compressor
50 electric motor
51 axial inlet
52 radial outlet
53 connection duct
54 electric generator
55 axes of rotation
56 transmission device
57 radial inlet
58 axial outlet
59 lubrication circuit
60 lubrication pump
61 lubrication pump
62 cooling circuit
63 cooling pump
64 basket
65 clutches
66 primary shafts
67 transmission shaft
68 secondary shaft
69 axle shafts
70 primary gear wheel
71 secondary gear wheel
72 synchronisers
73 accommodation body
74 bottom wall
75 aerodynamic extractor
76 chassis
77 side bars
78 engine compartment
79 opening
80 demountable panel
81 transparent window
82 screws
83 actuation system
84 variator device
85 axes of rotation
86 axis of rotation
87 intermediate shaft
88 axis of rotation
89 central gear wheel
90 side gear wheels
91 transmission
92 exhaust duct

The invention claimed is:

1. A car (1) comprising:
two front wheels (2); two rear wheels (4);
an internal combustion engine (5), which is provided with: a plurality of cylinders (18), where respective pistons (19) slide on the inside, a drive shaft (20) connected to the pistons (19), a plurality of intake valves (22) and of exhaust valves (25) operated by respective camshafts (23, 26), and a cylinder head (21), where the camshafts (23, 26) are arranged;
at least one first lubrication pump (60) configured to cause a lubricant oil to circulate; and
at least one cooling pump (63) configured to cause a coolant liquid to circulate;
wherein a first camshaft (23) axially projects out of the cylinder head (21) on both sides;
wherein the first lubrication pump (60) is coaxial to the first camshaft (23) and is directly connected to the first camshaft (23) so as to be caused to rotate by the first camshaft (23); and
wherein the cooling pump (63) is coaxial to the first camshaft (23) on the opposite side relative to the first lubrication pump (60) and is directly connected to the first camshaft (23) so as to be caused to rotate by the camshaft (23).

2. The car (1) according to claim 1, wherein:
a second lubrication pump (61) is provided; a second camshaft (26) axially projects out of the cylinder head (21) on at least one side; and
the second lubrication pump (61) is coaxial to the second camshaft (26) and is directly connected to the second camshaft (26) so as to be caused to rotate by the second camshaft (26).

3. The car (1) according to claim 2, wherein a lubrication pump (61) is a recovery pump and the other lubrication pump (60) is a delivery pump.

4. The car (1) according to claim 1, wherein two second lubrication pumps (61) are provided.

5. The car (1) according to claim 4, wherein a lubrication pump (60) is a delivery pump and the other two lubrication pumps (61) are recovery pumps.

6. The car (1) according to claim 5, wherein the two recovery lubrication pumps (61) are arranged on opposite sides of the cylinder head (21).

7. The car (1) according to claim 4, wherein:
a second camshaft (26) axially projects out of the cylinder head (21) on both sides; and
two lubrication pumps (60, 61) are coaxial to the second camshaft (26), are arranged on opposite sides of the second camshaft (26) and are directly connected to the second camshaft (26) so as to be caused to rotate by the second camshaft (26).

8. The car (1) according to claim 1, wherein the lubrication of the internal combustion engine (5) is a dry-sump lubrication.

9. The car (1) according to claim 1, wherein the internal combustion engine (5) is oriented with the drive shaft (20) arranged higher than the cylinders (18).

10. The car (1) according to claim 9, wherein the internal combustion engine (5) comprises a crankcase (17), where the cylinders (18) are obtained, which are open downwards, and the cylinder head (21), which makes up the crown of the cylinders (18) and is arranged under the crankcase (17).

11. The car (1) according to claim 1, wherein the internal combustion engine (5) is longitudinally arranged in a central or rear position.

12. The car (1) according to claim 1, wherein, in the internal combustion engine (5), the cylinders (18) are arranged in line.

* * * * *